US012330003B2

(12) United States Patent
Fieber et al.

(10) Patent No.: US 12,330,003 B2
(45) Date of Patent: Jun. 17, 2025

(54) FLUID DELIVERY SYSTEM FOR A FIRE APPARATUS

(71) Applicant: Oshkosh Corporation, Oshkosh, WI (US)

(72) Inventors: David Fieber, Neenah, WI (US); Brian Piller, Neenah, WI (US); Chad Trinkner, Neenah, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/373,819

(22) Filed: Sep. 27, 2023

(65) Prior Publication Data

US 2024/0017109 A1 Jan. 18, 2024

Related U.S. Application Data

(63) Continuation of application No. 17/531,017, filed on Nov. 19, 2021, now Pat. No. 11,813,489, which is a continuation of application No. 16/035,264, filed on Jul. 13, 2018, now Pat. No. 11,185,728.

(60) Provisional application No. 62/532,817, filed on Jul. 14, 2017.

(51) Int. Cl.

| | |
|---|---|
| ***A62C 37/00*** | (2006.01) |
| ***A62C 5/00*** | (2006.01) |
| ***A62C 27/00*** | (2006.01) |

(52) U.S. Cl.

CPC .............. *A62C 37/00* (2013.01); *A62C 5/002* (2013.01); *A62C 27/00* (2013.01)

(58) Field of Classification Search

CPC ......... A62C 37/00; A62C 37/04; A62C 37/08; A62C 5/002; A62C 27/00

See application file for complete search history.

(56) References Cited

U.S. PATENT DOCUMENTS

| | | | | |
|---|---|---|---|---|
| 4,324,294 | A | 4/1982 | Mcloughlin et al. | |
| 4,673,335 | A * | 6/1987 | Nicodemus ............... | F04F 5/24 417/174 |
| 5,074,522 | A | 12/1991 | Reynolds et al. | |
| 5,788,158 | A | 8/1998 | Relyea | |
| 5,839,664 | A | 11/1998 | Relyea | |
| 6,138,767 | A | 10/2000 | La Vergne | |
| 6,659,187 | B1 | 12/2003 | Crabtree et al. | |

(Continued)

FOREIGN PATENT DOCUMENTS

| | | |
|---|---|---|
| DE | 10 2013 201 299 A1 | 9/2016 |
| EP | 0 230 860 A1 | 8/1987 |

OTHER PUBLICATIONS

Notification of Transmittal of the International Search Report and the Written Opinion of the International Searching Authority, or the Declaration, Oshkosh Corporation, PCT/US2018/042124, Nov. 14, 2018.

*Primary Examiner* — Christopher R Dandridge

(74) *Attorney, Agent, or Firm* — Foley & Lardner LLP

(57) ABSTRACT

A ratio controller includes a housing defining a mixing chamber. The housing has a water inlet configured to receive water from a water supply, an agent inlet configured to receive agent from an agent supply, an outlet configured to output an agent-water solution, a first pressure port extending through a sidewall of the housing at a first position proximate the water inlet, and a second pressure port extending through the sidewall of the housing at a second position proximate the mixing chamber.

10 Claims, 17 Drawing Sheets

(56) References Cited

U.S. PATENT DOCUMENTS

| | | | | |
|---|---|---|---|---|
| 6,860,332 | B1 | 3/2005 | Archer et al. | |
| 7,140,552 | B1 * | 11/2006 | Crabtree ................ | A62C 31/02 169/44 |
| 7,234,534 | B2 | 6/2007 | Froland et al. | |
| 7,331,586 | B2 | 2/2008 | Trinkner et al. | |
| 7,367,361 | B2 * | 5/2008 | Steingass .............. | B01F 25/312 137/895 |
| 7,389,826 | B2 | 6/2008 | Linsmeier et al. | |
| 7,611,075 | B2 | 11/2009 | Relyea et al. | |
| 7,784,554 | B2 | 8/2010 | Grady et al. | |
| 7,874,373 | B2 | 1/2011 | Morrow et al. | |
| 7,987,916 | B2 | 8/2011 | Laskaris et al. | |
| 8,307,907 | B2 | 11/2012 | Laskaris et al. | |
| 8,376,719 | B2 | 2/2013 | Grady et al. | |
| 8,555,625 | B2 | 10/2013 | Trinkner et al. | |
| 8,739,892 | B2 | 6/2014 | Moore et al. | |
| 8,801,393 | B2 | 8/2014 | Crabtree et al. | |
| 9,061,169 | B2 | 6/2015 | Linsmeier | |
| 9,149,671 | B2 | 10/2015 | Hosfield et al. | |
| 9,327,150 | B2 | 5/2016 | Moore et al. | |
| 9,504,863 | B2 | 11/2016 | Moore | |
| 9,555,273 | B2 | 1/2017 | Stephens et al. | |
| 9,579,530 | B2 | 2/2017 | Betz et al. | |
| 9,597,536 | B1 | 3/2017 | Moore | |
| 9,814,915 | B2 | 11/2017 | Moore | |
| 11,185,728 | B2 | 11/2021 | Fieber et al. | |
| 2016/0346576 | A1 | 12/2016 | Hammer | |
| 2017/0009904 | A1 | 1/2017 | Mcloughlin | |

* cited by examiner

FLUID DELIVERY SYSTEM FOR A FIRE APPARATUS

CROSS-REFERENCE TO RELATED PATENT APPLICATIONS

This application is a continuation of U.S. patent application Ser. No. 17/531,017, filed Nov. 19, 2021, which is a continuation of U.S. patent application Ser. No. 16/035,264, filed Jul. 13, 2018, which claims the benefit of and priority to U.S. Provisional Patent Application No. 62/532,817, filed Jul. 14, 2017, all of which are incorporated herein by reference in their entireties.

BACKGROUND

Water and/or other agents (e.g., foam fire suppressants) may be transported by a fire apparatus to an emergency site to be discharged and facilitate extinguishment.

SUMMARY

One embodiment relates to a ratio controller for a fluid system of a fire apparatus. The ratio controller includes a housing defining a mixing chamber. The housing has a water inlet configured to receive water from a water supply, an agent inlet configured to receive agent from an agent supply, an outlet configured to output an agent-water solution, a first pressure port extending through a sidewall of the housing at a first position proximate the water inlet, and a second pressure port extending through the sidewall of the housing at a second position proximate the mixing chamber.

Another embodiment relates to a ratio controller. The ratio controller includes a housing having a sidewall. The housing defining a first inlet positioned at a first end of the housing and configured to receive a first fluid flow, a second inlet positioned along the sidewall and configured to receive a second fluid flow, an outlet positioned at an opposing second end of the housing and configured to output a mixture of the first fluid flow and the second fluid flow, a mixing chamber positioned between the first inlet and the outlet, a first port positioned along and extending through the sidewall proximate the first inlet, and a second port positioned along and extending through the sidewall proximate the mixing chamber.

Still another embodiment relates to a ratio controller. The ratio controller includes a housing. The housing define a mixing chamber, a first inlet positioned at a first end of the mixing chamber, an outlet positioned at an opposing second end of the mixing chamber, a second inlet positioned at a first location around a periphery of the mixing chamber between the first inlet and the outlet where the second inlet is configured to receive a second fluid input, and a third inlet positioned at a second location around the periphery of the mixing chamber between the first inlet and the outlet.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
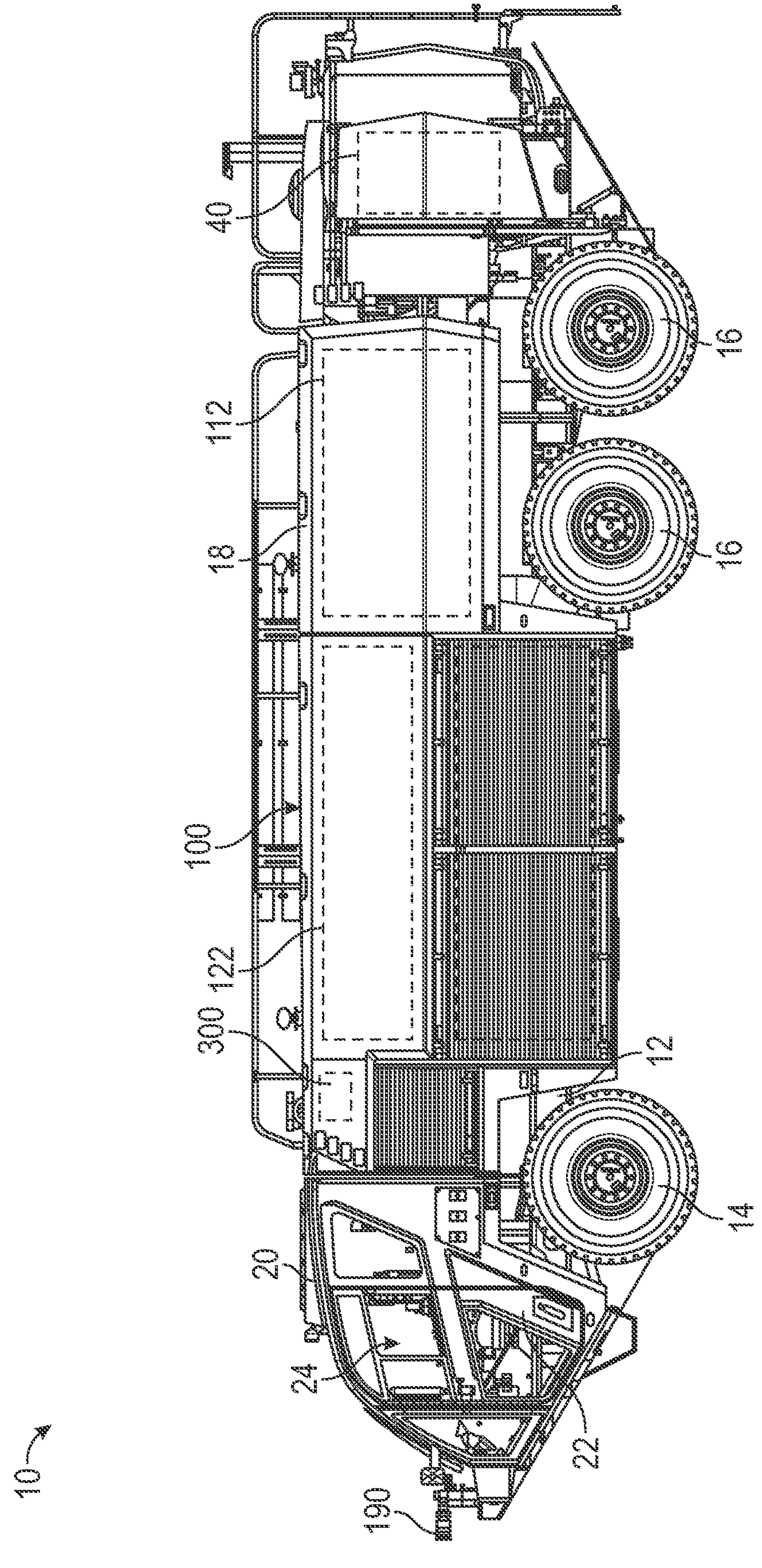
FIG. 1 is a left side view of a fire fighting vehicle, according to an exemplary embodiment.
Figure 2:
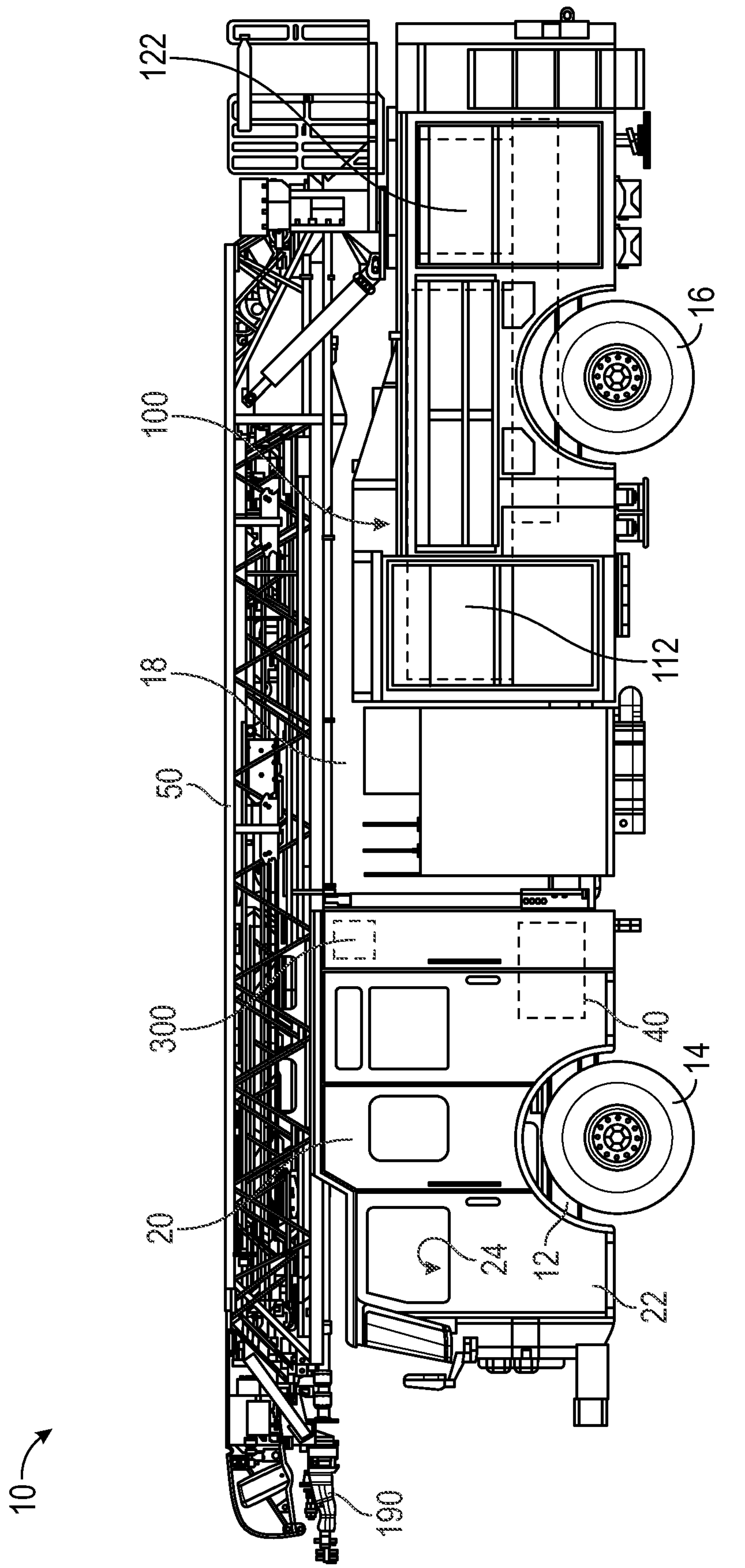
FIG. 2 is a left side view of a fire fighting vehicle, according to another exemplary embodiment.

According to the exemplary embodiment shown in FIGS. 1 and 2, a vehicle (e.g., a fire apparatus, etc.), shown as fire fighting vehicle 10, includes a fluid supply system, shown as fluid delivery system 100. According to an exemplary embodiment, the fluid delivery system 100 is configured to provide (e.g., pump, etc.) a fluid (e.g., water, etc.) and/or an agent (e.g., foam, etc.) to aid in extinguishing a fire. According to the exemplary embodiment shown in FIG. 1, the fire fighting vehicle 10 is an aircraft rescue and firefighting ("ARFF") truck. According to the exemplary embodiment shown in FIG. 2, the fire fighting vehicle is a quint fire truck having an aerial ladder assembly 50. According to various alternative embodiments, the fire fighting vehicle 10 is a municipal fire fighting vehicle, a tiller fire apparatus, a forest fire apparatus, an aerial truck, a rescue truck, a tanker, or still another type of fire fighting vehicle or apparatus. According to still other embodiments, the vehicle is another type of vehicle (e.g., a military vehicle, a commercial vehicle, etc.).

As shown in FIGS. 1 and 2, the fire fighting vehicle 10 includes a chassis, shown as frame 12. The frame 12 supports a plurality of tractive elements, shown as front wheels 14 and rear wheels 16; a body assembly, shown as a rear section 18; and a cab, shown as front cabin 20. In one embodiment, the fire fighting vehicle 10 is a Striker® 6×6 with one front axle to support the front wheels 14 and two rear axles to support the rear wheels 16 manufactured by Oshkosh Corporation®. In other embodiments, the fire fighting vehicle 10 is a Striker® 4×4, a Striker® 1500, a Striker® 3000, or a Striker® 4500 model manufactured by Oshkosh Corporation®. In still other embodiments, the fire fighting vehicle 10 is an Ascendant® model manufactured by Pierce Manufacturing®. Thus, the fire fighting vehicle 10 may include a different number of front axles and/or rear axles to support the front wheels 14 and the rear wheels 16 based on the application or model of the fire fighting vehicle 10. In an alternative embodiment, the tractive elements are otherwise structured (e.g., tracks, etc.).

As shown in FIGS. 1 and 2, the front cabin 20 is positioned forward of the rear section 18 (e.g., with respect to a forward direction of travel for the vehicle, etc.). According to an alternative embodiment, the front cabin 20 is positioned behind the rear section 18 (e.g., with respect to a forward direction of travel for the vehicle, etc.). According to an exemplary embodiment, the front cabin 20 includes a plurality of body panels coupled to a support (e.g., a structural frame assembly, etc.). The body panels may define a plurality of openings through which an operator accesses (e.g., for ingress, for egress, to retrieve components from within, etc.) an interior 24 of the front cabin 20. As shown in FIGS. 1 and 2, the front cabin 20 includes a pair of doors 22 positioned over the plurality of openings defined by the plurality of body panels. The doors 22 may provide access to the interior 24 of the front cabin 20 for a driver (or passengers) of the fire fighting vehicle 10.

The front cabin 20 may include components arranged in various configurations. Such configurations may vary based on the particular application of the fire fighting vehicle 10, customer requirements, or still other factors. The front cabin 20 may be configured to contain or otherwise support at least one of a number of occupants, storage units, equipment, and/or user interfaces. By way of example, the front cabin 20 may include a display, a joystick, buttons, switches, knobs, levers, touchscreens, a steering wheel, an accelerator pedal, a brake pedal, among other components. The user interface may provide the operator with control capabilities over the fire fighting vehicle 10 (e.g., direction of travel, speed, a transmission gear, etc.), one or more components of the fluid delivery system 100 (e.g., a turret, a pump, etc.), and still other components of the fire fighting vehicle 10 from within the front cabin 20.

As shown in FIGS. 1 and 2, the fire fighting vehicle 10 includes a powertrain, shown as powertrain 40. The powertrain 40 of the fire fighting vehicle 10 may include a main driver (e.g., engine, motor, etc.), a transmission, a clutch, and/or a pump transfer case. The powertrain 40 may be coupled to a drivetrain (e.g., a drive shaft, a differential, an axle, etc. via the transmission, etc.) and/or a pump (e.g., a pump of the fluid delivery system 100 via the pump transfer case, etc.). According to an exemplary embodiment, the powertrain 40 (e.g., the engine, transmission, clutch, pump transfer case, etc. thereof) is coupled to and supported by the frame 12. According to an exemplary embodiment, the engine receives fuel (e.g., gasoline, diesel, etc.) from a fuel tank and combusts the fuel to generate mechanical energy. The transmission receives the mechanical energy and provides an output to a drive shaft and/or the pump transfer case. The rotating drive shaft is received by a differential, which conveys the rotational energy of the drive shaft to a final drive or tractive element, such as the front wheels 14 and/or the rear wheels 16. The front wheels 14 and/or the rear wheels 16 then propel or move the fire fighting vehicle 10. The powertrain 40 may be configured to drive the front wheels 14, the rear wheels 16, or a combination thereof (e.g., front-wheel-drive, rear-wheel-drive, all-wheel-drive, etc.). The driven pump transfer case may convey the mechanical energy provided by the transmission to a pump (e.g., a water pump, an agent pump, etc.) of the fluid delivery system 100 to drive a fluid (e.g., water, agent, etc.) through the fluid delivery system 100 to be used for fire suppression. According to an exemplary embodiment, the engine is a compression-ignition internal combustion engine that utilizes diesel fuel. In alternative embodiments, the engine is another type of driver (e.g., spark-ignition engine, fuel cell, electric motor, hybrid engine/motor, etc.) that is otherwise powered (e.g., with gasoline, compressed natural gas, hydrogen, electricity, etc.).

Figure 3:
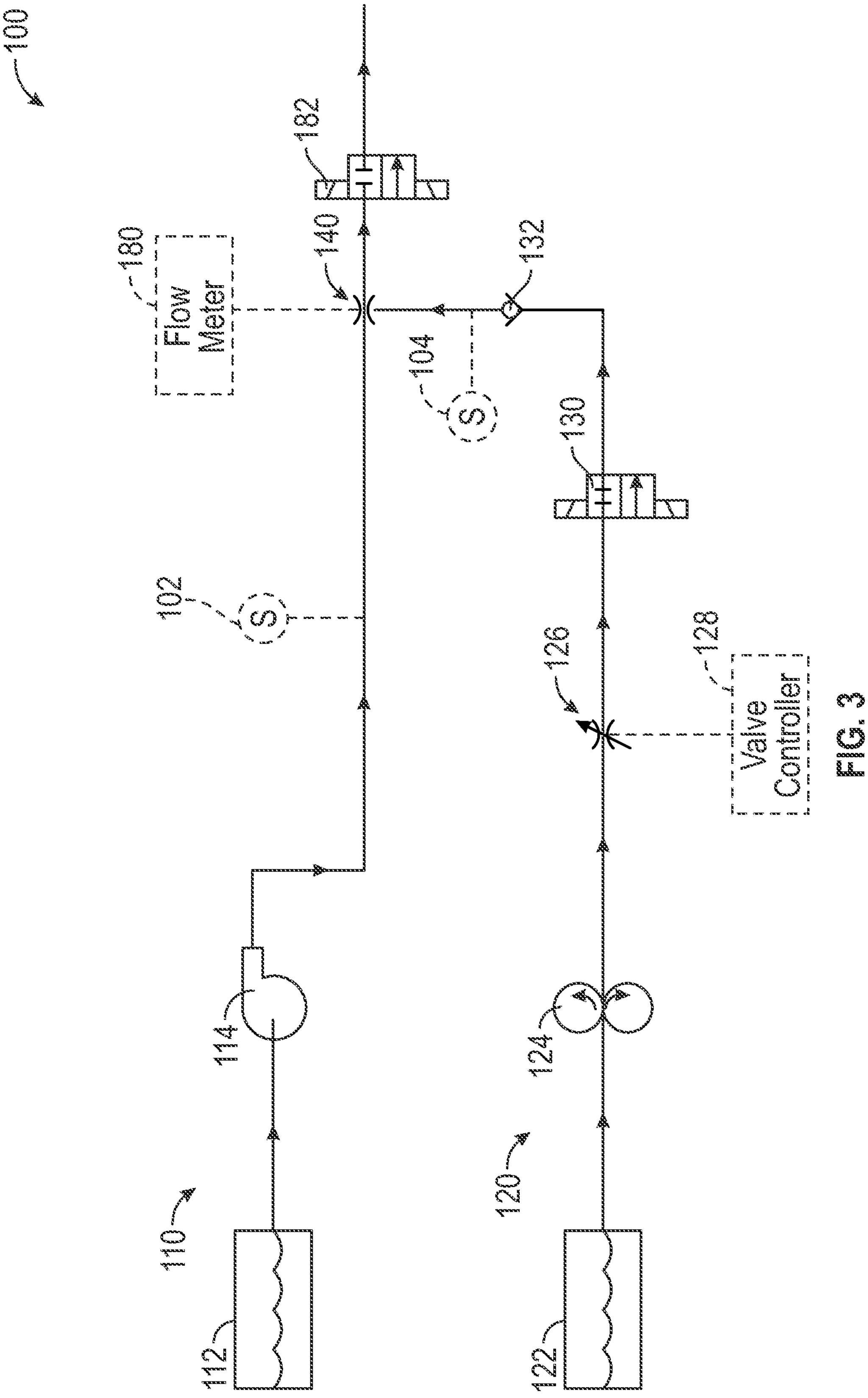
FIG. 3 is a schematic diagram of a fluid delivery system for the fire fighting vehicles of FIGS. 1 and 2, according to an exemplary embodiment.
Figure 4:
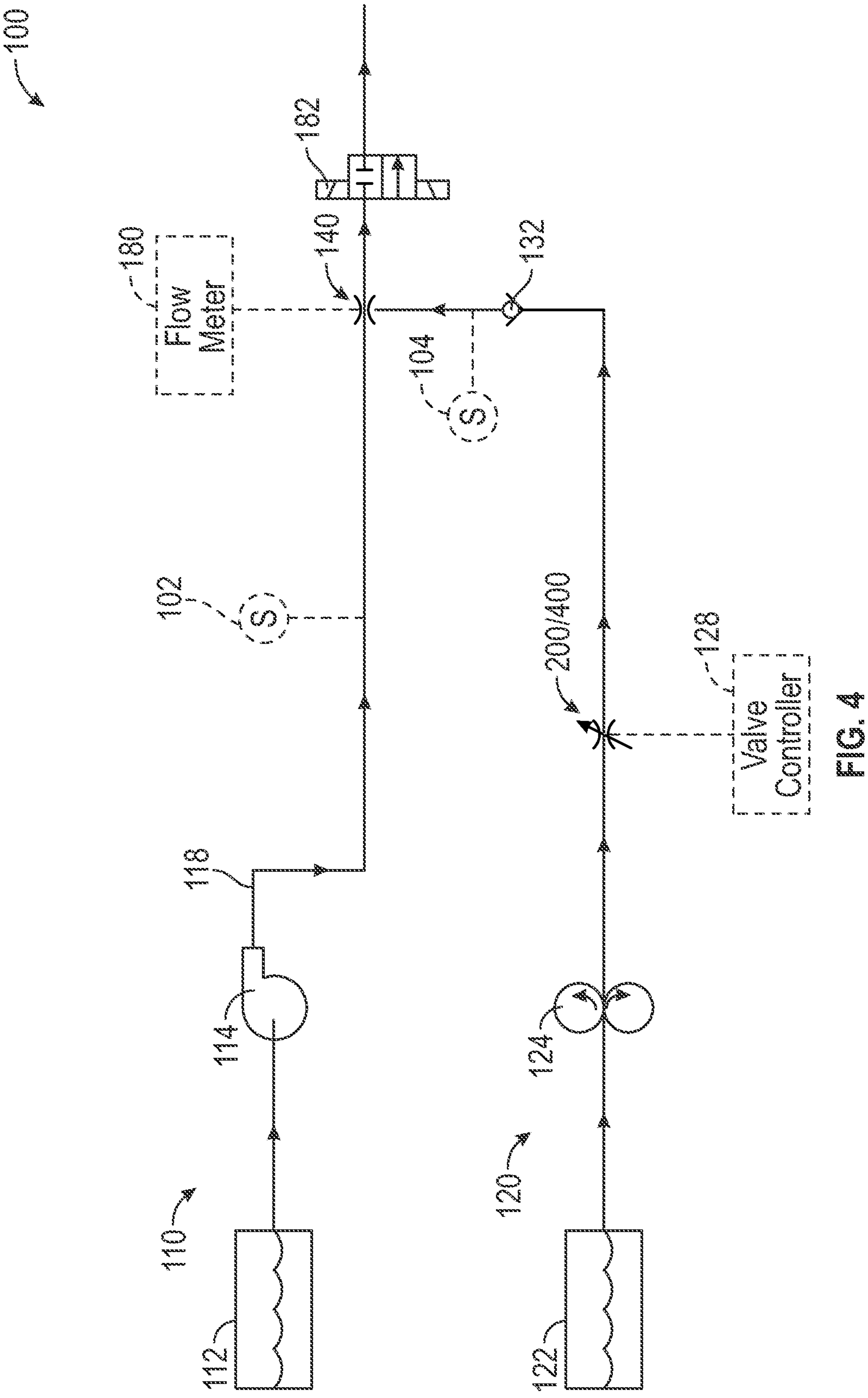
FIG. 4 is a schematic diagram of a fluid delivery system for the fire fighting vehicles of FIGS. 1 and 2, according to another exemplary embodiment.

As shown in FIGS. 3 and 4, the fluid delivery system 100 includes a first fluid circuit, shown as water circuit 110; a second fluid circuit, shown as agent circuit 120; a ratio controller, show as ratio controller 140; and a valve, shown as discharge valve 182. As shown in FIGS. 3 and 4, the water circuit 110 includes a first tank, shown as water tank 112, and a first pump, shown as water pump 114. In some embodiments, the water circuit 110 does not include the water tank 112, but is configured to couple to an external water source (e.g., a fire hydrant, etc.). The water pump 114 is configured to pump water stored within the water tank 112 at a target flow rate (e.g., a target volumetric flow rate; 6000 gallons-per-minute ("gpm"), 3000 gpm, 1500 gpm, etc.; based on engine speed; based on a user input; etc.) through the water circuit 110 to the ratio controller 140. According to an exemplary embodiment, the water pump 114 is coupled to and driven by the engine of the powertrain 40 via the pump transfer case thereof. In other embodiments, the water pump 114 is driven by a device designated solely for the water pump 114 (e.g., a motor, etc.).

As shown in FIG. 3, the agent circuit 120 includes a second tank, shown as agent tank 122; a second pump, shown as agent pump 124; a metering device, shown as agent metering valve 126; a blocking valve, shown as agent shut-off valve 130; and a one-way valve, shown as agent check valve 132. As shown in FIG. 4, the agent circuit 120 does not include the agent metering valve 126 or the agent shut-off valve 130, but rather the agent metering valve 126 and the agent shut-off valve 130 are replaced with a first single valve component, shown as combined agent metering and shut-off valve assembly 200, or a second single valve component, shown as combined agent metering and shut-off valve assembly 400. In some embodiments, the agent circuit 120 does not include the agent check valve 132 (e.g., in embodiments where the agent circuit 120 may include the combined agent metering and shut-off valve assembly 400 which may include an integrated check valve, etc.). The agent pump 124 is configured to drive agent stored within the agent tank 122 (e.g., at a target volumetric flow rate, X gallons-per-minute ("gpm"), based on the flow rate of the water entering the ratio controller 140, based on a user input, etc.) through the agent circuit 120 to the ratio controller 140. In some embodiments, the agent pump 124 is coupled to and driven by the engine of the powertrain 40 (e.g., via a power-take-off ("PTO"), etc.). In some embodiment, the agent pump 124 is driven by a device designated solely for the agent pump 124 (e.g., a motor, etc.).

As shown in FIGS. 1 and 2, the water tank 112 and the agent tank 122 are disposed within the rear section 18 of the fire fighting vehicle 10. In other embodiments, the water tank 112 and/or the agent tank 122 are otherwise positioned (e.g., disposed along a rear, front, roof, side, etc. of the fire fighting vehicle 10). According to an exemplary embodiment, the water tank 112 and/or the agent tank 122 are corrosion and UV resistant polypropylene tanks. In other embodiments, the water tank 112 and/or the agent tank 122 are manufactured from another suitable material.

According to an exemplary embodiment, the water tank 112 is configured to store a fluid, such as water or another liquid. In one embodiment, the water tank 112 is a 3,000 gallon capacity tank. In another embodiment, the water tank 112 is a 1,500 gallon capacity tank. In still another embodiment, the water tank 112 is a 4,500 gallon capacity tank. In other embodiments, the water tank 112 has another capacity. In some embodiments, multiple water tanks 112 are disposed within and/or along the rear section 18 of the fire fighting vehicle 10.

According to an exemplary embodiment, the agent tank 122 is configured to store an agent, such as a foam fire suppressant. According to an exemplary embodiment, the agent is an aqueous film forming foam ("AFFF"). AFFF is water-based and frequently includes hydrocarbon-based surfactant (e.g., sodium alkyl sulfate, etc.) and a fluorosurfactant (e.g., fluorotelomers, perfluorooctanoic acid, perfluorooctanesulfonic acid, etc.). AFFF has a low viscosity and spreads rapidly across the surface of hydrocarbon fuel fires. An aqueous film forms beneath the foam on the fuel surface that cools burning fuel and prevents evaporation of flammable vapors and re-ignition of fuel once it has been extinguished. The film also has a self-healing capability whereby holes in the film layer are rapidly resealed. In alternative embodiments, another agent is stored with the agent tank 122 (e.g., low-expansion foams, medium-expansion foams, high-expansion foams, alcohol-resistant foams, synthetic foams, protein-based foams, foams to be developed, etc.). In one embodiment, the agent tank 122 is a 420 gallon capacity tank. In another embodiment, the agent tank 122 is a 210 gallon capacity tank. In still another embodiment, the agent tank 122 is a 630 gallon capacity tank. In other embodiments, the agent tank 122 has another capacity. In some embodiments, multiple agent tanks 122 are disposed within and/or along the rear section 18 of the fire fighting vehicle 10. The capacity of the water tank 112 and/or the agent tank 122 may be specified by a customer. It should be understood that water tank 112 and the agent tank 122 configurations are highly customizable, and the scope of the present application is not limited to particular size or configuration of the water tank 112 and the agent tank 122.

As shown in FIGS. 3 and 4, the fluid delivery system 100 optionally includes a first sensor, shown as water circuit sensor 102, and a second sensor, shown as agent circuit sensor 104. The water circuit sensor 102 may include one or more sensors variously positioned along the water circuit 110. By way of example, the water circuit sensor(s) 102 may be positioned downstream of the water tank 112 and upstream of the water pump 114 and/or downstream of the water pump 114. The water circuit sensor(s) 102 may include (i) one or more water pressure sensors positioned to facilitate monitoring the pressure of the water within water circuit 110 upstream and/or downstream of the water pump 114 and/or (ii) a water flow meter positioned to facilitate monitoring the flow rate (e.g., volumetric flow rate, etc.) of the water flowing through the water circuit 110 to the ratio controller 140.

The agent circuit sensor 104 may include one or more sensors variously positioned along the agent circuit 120. By way of example, the agent circuit sensor(s) 104 may be positioned downstream of the agent tank 122 and upstream of the agent pump 124, downstream of the agent pump 124 and upstream of the agent metering valve 126, downstream of the agent metering valve 126 and upstream of the agent shut-off valve 130, downstream of the agent shut-off valve 130 and upstream of the agent check valve 132, downstream of the agent check valve 132, downstream of the agent pump 124 and upstream of the combined agent metering and shut-off valve assembly 200, downstream of the combined agent metering and shut-off valve assembly 200 and the agent check valve 132, downstream of the agent pump 124 and upstream of the combined agent metering and shut-off valve assembly 400, and/or downstream of the combined agent metering and shut-off valve assembly 400. The agent circuit sensor(s) 104 may include (i) one or more agent pressure sensors positioned to facilitate monitoring the pressure of the agent at any desired location within the agent circuit 120 and/or (ii) an agent flow meter positioned to facilitate monitoring the flow rate (e.g., volumetric flow rate, etc.) of the agent flowing through the agent circuit 120 to the ratio controller 140.

As shown in FIGS. 3 and 4, the agent metering valve 126, the combined agent metering and shut-off valve assembly 200, and/or the combined agent metering and shut-off valve assembly 400 are optionally coupled to a controller, shown as valve controller 128. The agent metering valve 126, the combined agent metering and shut-off valve assembly 200, and/or the combined agent metering and shut-off valve assembly 400 may thereby be configured as a non-self-adjusting or non-continuous metering valve (e.g., manually/mechanically set and controlled, in embodiments where the fluid delivery system 100 does not include the valve controller 128, etc.) and/or a self-adjusting, continuous metering valve (e.g., automatically/electronically controlled, in embodiments where the fluid delivery system 100 includes the valve controller 128, etc.).

According to an exemplary embodiment, the agent metering valve 126 is configured to selectively restrict the amount of agent flowing therethrough such that the agent mixes with the water (e.g., within the ratio controller 140, etc.) to create an agent-water solution with an appropriate agent-to-water ratio. In embodiments where the fluid delivery system 100 does not include the valve controller 128, the agent metering valve 126 may be any type of metering valve (e.g., a ball valve, a spool valve, a v-notch valve, etc.) that does not provide self-adjustment over a continuous range of agent-to-water ratios. By way of example, the agent metering valve 126 may have multiple predefined orifices and/or valve settings that provide discrete adjustment of the agent-to-water ratio of the agent-water solution in specific, predefined increments (e.g., 0.5%, 1%, 3%, 6%, etc., etc.).

In embodiments where the fluid delivery system 100 includes the valve controller 128, the agent metering valve 126 may be a self-adjusting, adaptive metering valve configured to provide a continuous range of agent-to-water ratios (e.g., any agent-to-water ratio between 0% and 10%, etc.) for all rated water flows of the fluid delivery system 100. By way of example, the valve controller 128 may be configured to receive an indication of the water flow rate entering the ratio controller 140. The indication of the water flow rate may be provided by a signal from the water circuit sensor 102 (e.g., a water flow meter, etc.) and/or a signal from the ratio controller 140 (e.g., a flow meter of the ratio controller 140, etc.). The valve controller 128 may be further configured to receive an indication of a desired agent-to-water ratio for the agent-water solution (e.g., from an operator using a user interface of the fire fighting vehicle 10, etc.). The valve controller 128 may be configured to (i) receive the indication of the water flow rate and the indication of the desired agent-to-water ratio and (ii) adaptively adjust (e.g., modulate, vary, etc.) an orifice size or valve position of the agent metering valve 126 as the water flow rate fluctuates (e.g., the orifice size or valve position is increased as the water flow rate increases such that more agent is provided, the orifice size or valve position is decreased as the water flow rate decreases such that less agent is provided, etc.) to maintain an accurate agent concentration within the agent-water solution. According to an exemplary embodiment, such a self-adjusting agent metering valve 126 is configured to facilitate providing agent-water solutions having an agent-to-water ratio within 0.1% accuracy of the desired agent-to-water ratio, while traditional agent metering valves may facilitate providing agent-water solutions having agent-to-water ratios within 1% accuracy. Therefore, at a water flow rate of 6000 gpm, a traditional agent metering valve may provide up to 60 gallons per minute of excess agent, while the self-adjusting agent metering valve may provide less than 6 gallons per minute of potential excess agent.

The valve controller 128 may be configured to determine the orifice size or valve position at which to adjust the agent metering valve 126 by storing a few calibration points for various agent-to-water ratios. By way of example, the valve controller 128 may be configured to store a few (e.g., two, three, four, five, etc.) predetermined orifice sizes or valve positions for a few (e.g., two, three, four, five, etc.) predetermined water flow rates (e.g., 1500 gpm, 3000 gpm, 4500 gpm, 6000 gpm, etc.) that provide specific agent-to-water ratios (e.g., common agent-to-water ratios such as 0.3%, 0.5%, 1%, 3%, 6%, etc.). For example, the valve controller 128 may store three water flow rates and three corresponding orifice sizes or valve positions that that provide each specific agent-to-water ratio. From such predefined parameters, a curve may be generated by the valve controller 128 for each of the predefined specific agent-to-water ratios (e.g., based on the predefined orifice sizes and water flow rates for each agent-to-water ratios, etc.). Therefore, if an operator selects one of the predefined agent-to-water ratios (e.g., 0.3%, 1%, 3%, 6%, etc.), the orifice size or position of the agent metering valve may be determined by the valve controller 128 at the point at which the current water flow rate intersect the curve for the selected, predefined agent-to-water ratio. However, if an operator selects an agent-to-water ratio that is not predefined (e.g., a ratio other than 0.3%, 0.5%, 1%, 3%, 6%, etc.), the valve controller 128 may be configured to derive the orifice size or position of the agent metering valve 126. By way of example, if an agent-to-water ratio of 0.75% is selected, the predefined orifice sizes or positions of the agent metering valve 126 from the upper agent-to-water ratio curve (e.g., 1% curve, etc.) and the lower agent-to-water ratio curve (e.g., the 0.5% curve, etc.) may be averaged for each predetermined water flow rate (e.g., 1500 gpm, 3000 gpm, 4500 gpm, 6000 gpm, etc.) to generate an intermediate curve for the selected agent-to-water ratio (e.g., 0.75%, etc.). The valve controller 128 may then determine the orifice size or position of the agent metering valve 126 at the point where the current water flow rate intersect the derived curve.

According to an exemplary embodiment, the agent shut-off valve 130 is configured to facilitate selectively isolating the agent circuit 120 from the ratio controller 140. By way of example, the agent shut-off valve 130 may (i) prevent agent from passing therethrough and reaching the ratio controller 140 when arranged in a first configuration (e.g., a closed configuration, etc.) such that only water is discharged from the fluid delivery system 100 and (ii) allow agent to pass freely therethrough and mix with the water within the ratio controller 140 when arranged in a second configuration (e.g., an open configuration, etc.) such that an agent-water solution is discharged from the fluid delivery system 100. The agent shut-off valve 130 may be a manually-actuated valve or an electronically-actuated valve.

According to an exemplary embodiment, the combined agent metering and shut-off valve assembly 200 and/or the combined agent metering and shut-off valve assembly 400 are configured to replace and perform the various function described herein in relation to the agent metering valve 126, the agent shut-off valve 130, and/or the agent check valve 132.

As a brief overview of the combined agent metering and shut-off valve assembly 200, the agent metering and shut-off valve assembly 200 includes a ball that defines an elongated "V" notch that variably restricts agent flow through the combined agent metering and shut-off valve assembly 200. The combined agent metering and shut-off valve assembly 200 has an inlet, an outlet, and a 90 degree flow path extending therebetween. The ball is capable of shutting the "V" notch completely (e.g., thereby functioning as both the agent metering valve 126 and the agent shut-off valve 130, etc.). By lengthening the "V" notch, agent flow can be accurately controlled over a greater range of agent and water flow rates.

Figure 6A:
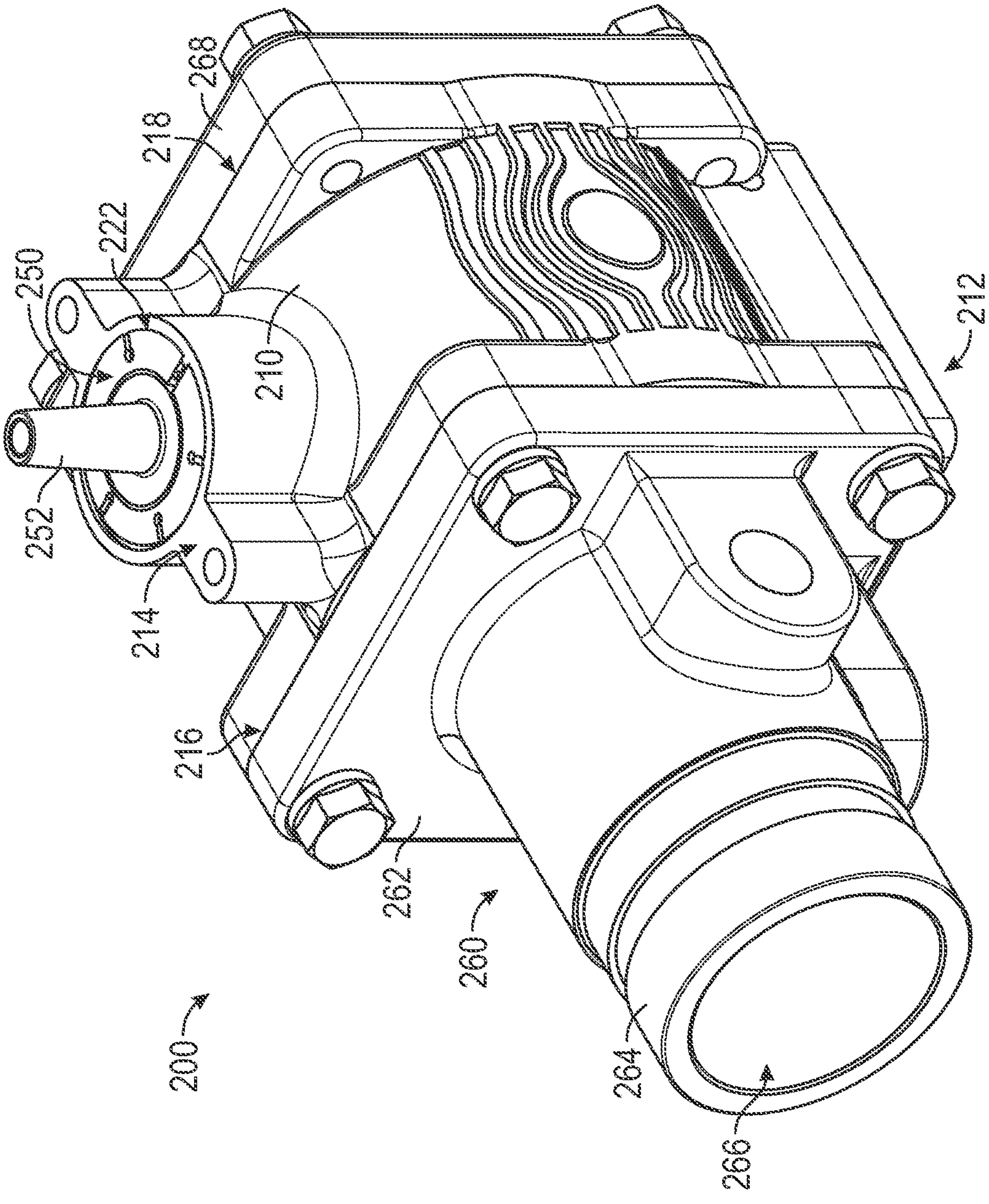
FIGS. 6A-6F are various views of a combined metering and shut-off valve assembly of the fluid delivery system of FIG. 4, according to an exemplary embodiment.
Figure 6B:
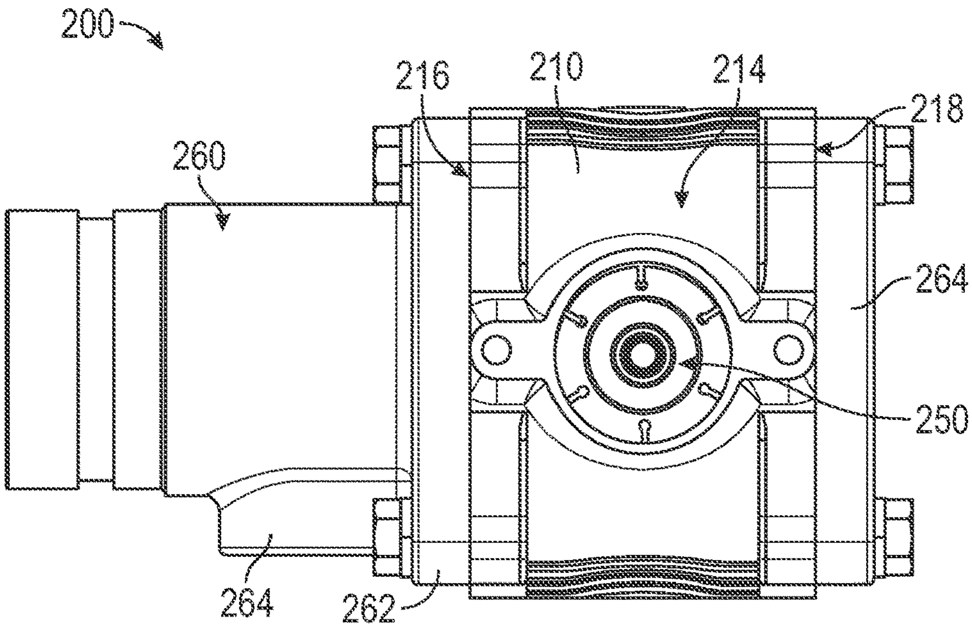
Figure 6C:
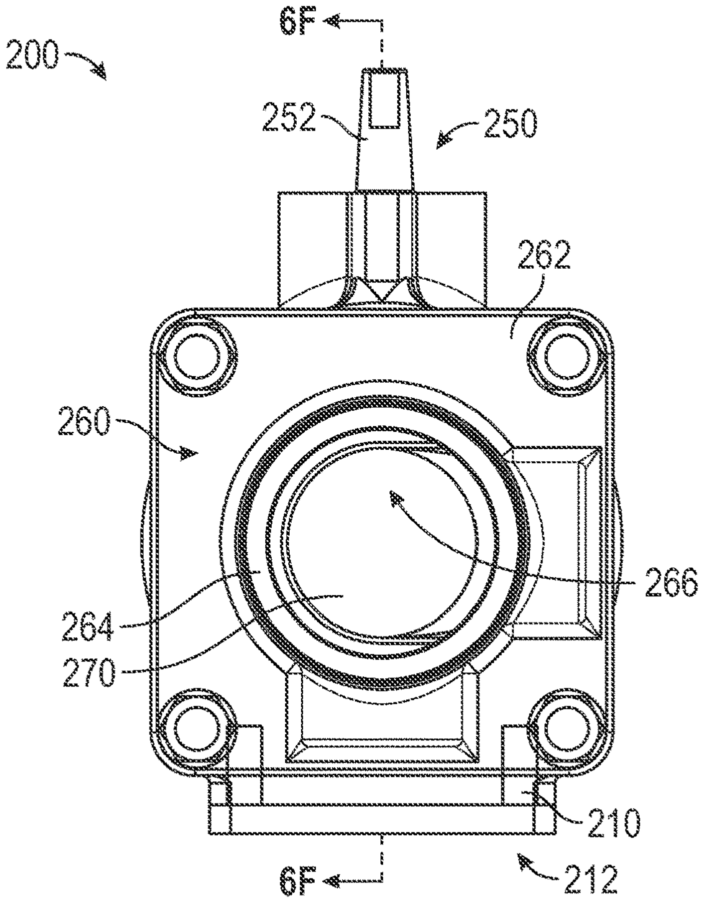
Figure 6D:
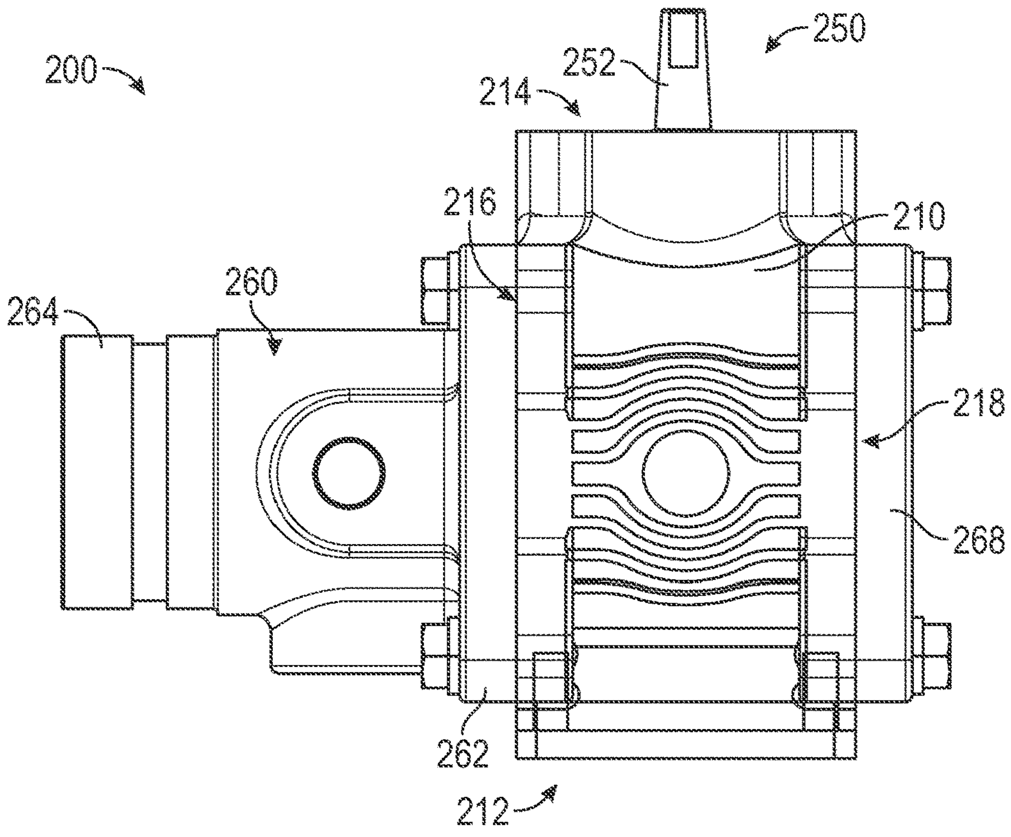
Figure 6E:
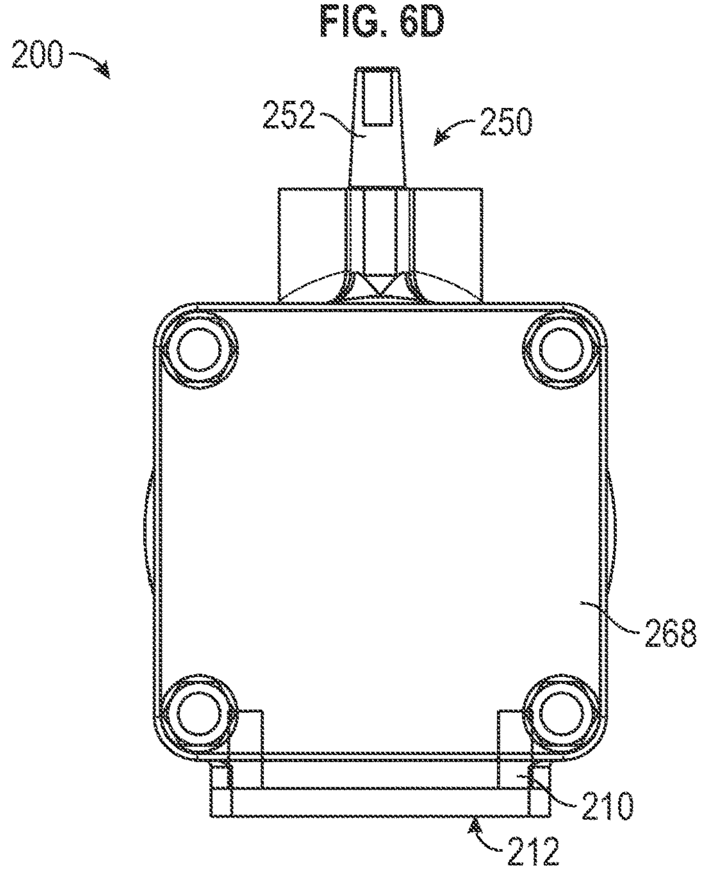
Figure 6F:
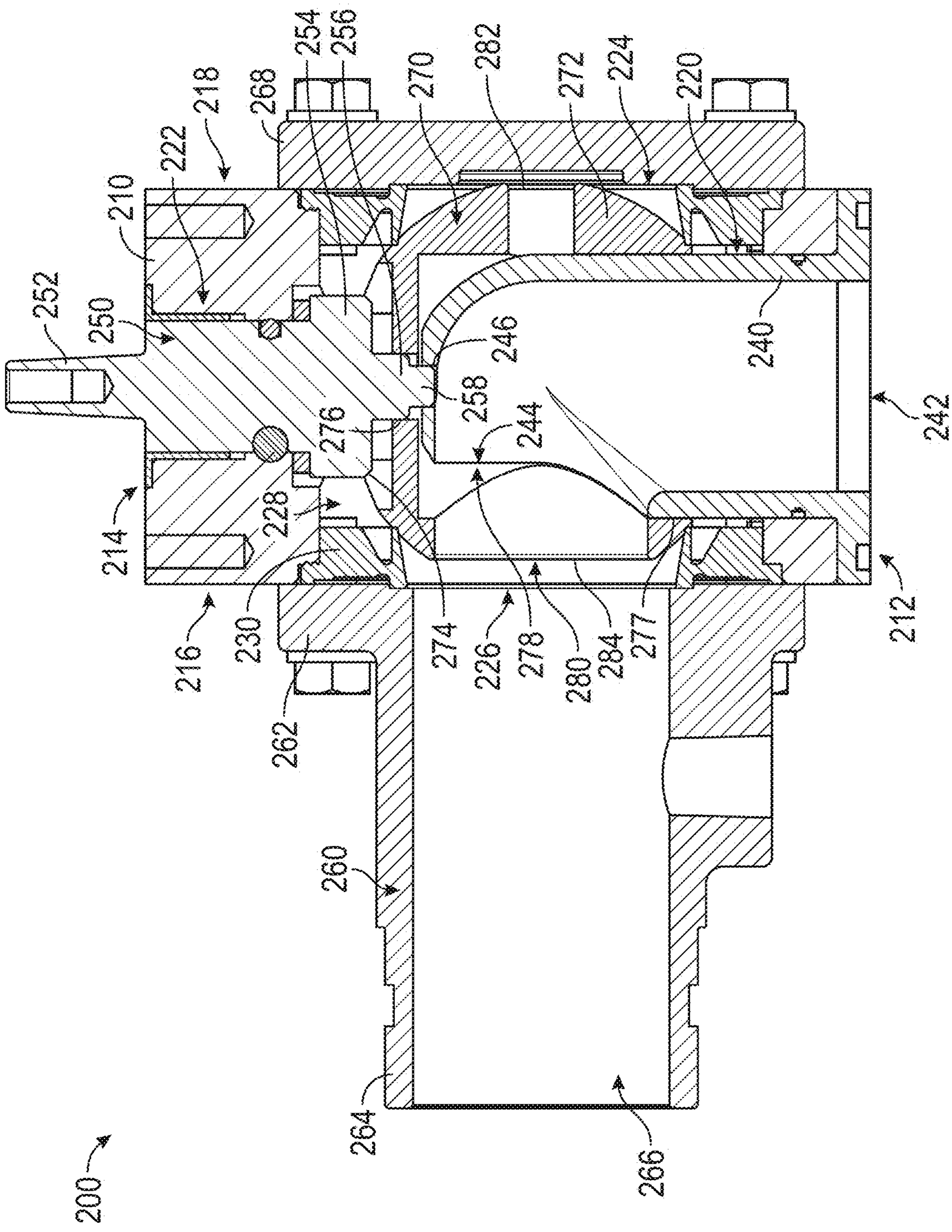

As shown in FIGS. 6A-6F, the combined agent metering and shut-off valve assembly 200 includes a housing, shown as valve body 210; an inner sleeve, shown as flow directing conduit 240; an adjuster, shown as ball adjuster 250; an extension, shown as valve spout 260; a plate, shown as end plate 268; and a flow restrictor, shown as ball 270. As shown in FIGS. 6A-6F, the valve body 210 has a first end, shown as bottom end 212; an opposing second end, shown as top end 214; a first lateral face, shown as front face 216; and an opposing second face, shown as rear face 218. As shown in FIG. 6F, the bottom end 212 of the valve body 210 defines an aperture, shown as valve body inlet 220. The top end 214 of the valve body 210 defines a passage, shown as top passage 222. The rear face 218 of the valve body 210 defines an aperture, shown as rear opening 224. The front face 216 of the valve body 210 defines an opening, shown as valve body outlet 226. The valve body inlet 220, the top passage 222, the rear opening 224, and the valve body outlet 226 each lead into an internal cavity, shown as interior chamber 228, defined by the valve body 210.

As shown in FIG. 6F, the flow directing conduit 240 is received by the valve body inlet 220 and at least partially disposed within the interior chamber 228 of the valve body 210. The flow directing conduit 240 includes an inlet, shown as agent inlet 242, positioned at the valve body inlet 220 at the bottom end 212 of the valve body 210 and an outlet, shown as agent outlet 244, positioned to align with the valve body outlet 226 at the front face 216 of the valve body 210. According to an exemplary embodiment, the agent outlet 244 is positioned perpendicularly relative to the agent inlet 242 such that the flow directing conduit 240 directs incoming agent along a ninety degree flow path (e.g., the agent comes in the bottom end 212 and exits the front face 216, etc.). As shown in FIG. 6F, a top end of a sidewall of the flow directing conduit 240 defines an aperture, shown as aperture 246.

As shown in FIGS. 6A and 6F, the ball adjuster 250 is received by the top passage 222 of the valve body 210. As shown in FIGS. 6A and 6C-6F, the ball adjuster 250 includes a handle, shown as knob 252. The knob 252 may be manually actuated by an operator such that the ball adjuster

250 is rotated within the interior chamber 228 of the valve body 210. In some embodiments, the ball adjuster 250 is electrically actuated (e.g., with an electric actuator, a solenoid, etc.) by the valve controller 128 (e.g., such that the combined agent metering and shut-off valve assembly 200 is self-adjusting, an adaptive metering valve, etc.). As shown in FIG. 6F, the ball adjuster 250 includes an interface, shown as ball key 254, having a first projection, shown as first cylindrical protrusion 256, extending therefrom. The first cylindrical protrusion 256 has a second projection, shown as second cylindrical protrusion 258, extending therefrom and received by the aperture 246 of the flow directing conduit 240.

As shown in FIGS. 6A-6D and 6F, the valve spout 260 includes a coupler, shown as flange 262, with a protrusion, shown as outlet conduit 264, extending therefrom. As shown in FIGS. 6A, 6C, and 6F, the flange 262 and the outlet conduit 264 cooperatively define a passage, shown as discharge passage 266. As shown in FIGS. 6A-6D and 6F, the flange 262 is coupled to the valve spout 260 to the front face 216 of the valve body 210 such that the discharge passage 266 aligns with the valve body outlet 226 to receive agent therefrom. As shown in FIG. 6F, a resilient member, shown as seal 230, is positioned between the flange 262 and the front face 216 of the valve body 210 to prevent agent from seeping through the interface therebetween. As shown in FIGS. 6A, 6B, and 6D-6F, the end plate 268 is coupled to the rear face 218 of the valve body 210. The end plate 268 is positioned to enclose the rear opening 224 in the rear face 218 of the valve body 210.

As shown in FIG. 6F, the ball 270 is disposed within the interior chamber 228 of the valve body 210. As shown in FIGS. 6F-7E, the ball 270 has an outer wall, shown as shell 272, having a first end, shown as top end 290, and an opposing second end, shown as bottom end 292. According to an exemplary embodiment, the shell 272 is substantially spherical. According to the exemplary embodiment shown in FIGS. 7C and 7D, the bottom end 292 of the shell 272 has a flat surface. In other embodiments, the bottom end 292 of the shell 272 is spherical. According to the exemplary embodiment shown in FIGS. 7A and 7E, the shell 272 has a partially lobed or camed profile.

As shown in FIGS. 6F-7C, the top end 290 of the shell 272 of the ball 270 defines a cutout, shown as keyed recess 274, and an aperture, shown as through-hole 276. As shown in FIG. 6F, the keyed recess 274 receives the ball key 254 of the ball adjuster 250 and the through-hole 276 receives the first cylindrical protrusion 256. According to an exemplary embodiment, the engagement between the keyed recess 274 and the ball key 254 facilitates rotating the ball 270 within the interior chamber 228 with the ball adjuster 250. According to an exemplary embodiment, the ball 270 is rotatable through two hundred degrees of rotation. Rotating the ball 270 two hundred degrees may facilitate completely shutting off the flow of agent through the valve body 210 (e.g., the ball 270 functions similar to the agent shut-off valve 130, etc.). In other embodiments, the ball 270 is rotatable more than or less than two hundred degrees (e.g., 90 degrees, 180 degrees, 225 degrees, 270 degrees, 315 degrees, 360 degrees, anywhere therebetween, etc.).

Figure 7A:
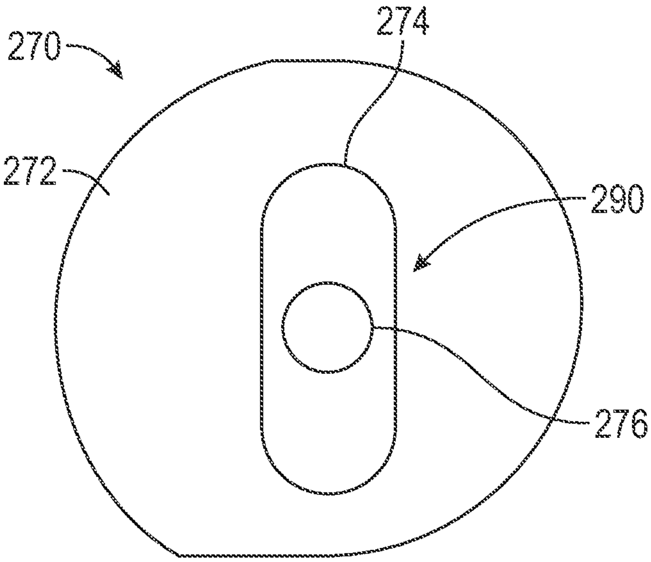
FIGS. 7A-7E are various views of a ball of the combined metering and shut-off valve assembly of the fluid delivery system of FIGS. 6A-6F, according to an exemplary embodiment.
Figure 7B:
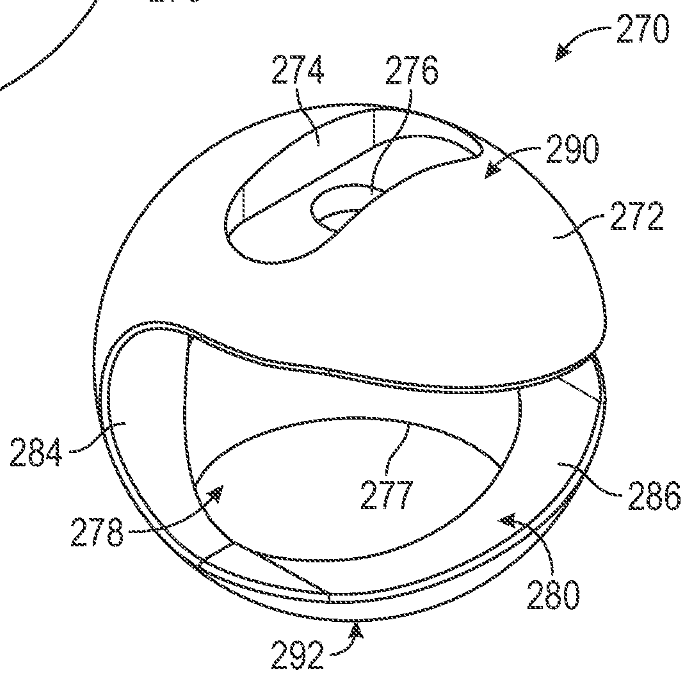
Figure 7C:
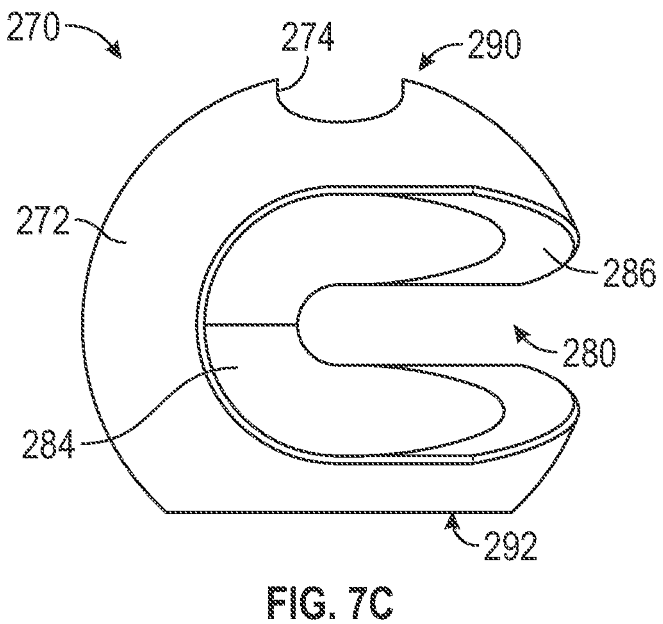
Figure 7D:
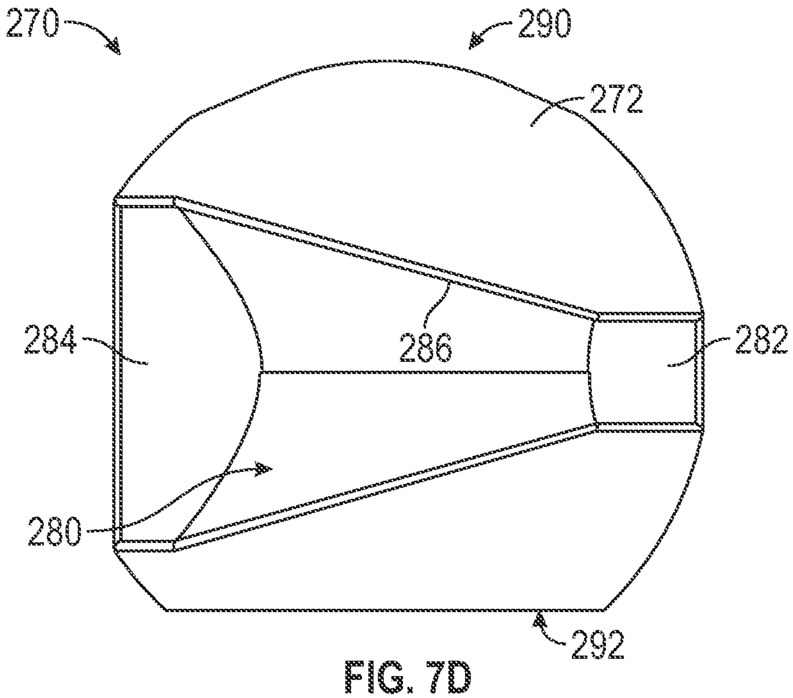
Figure 7E:
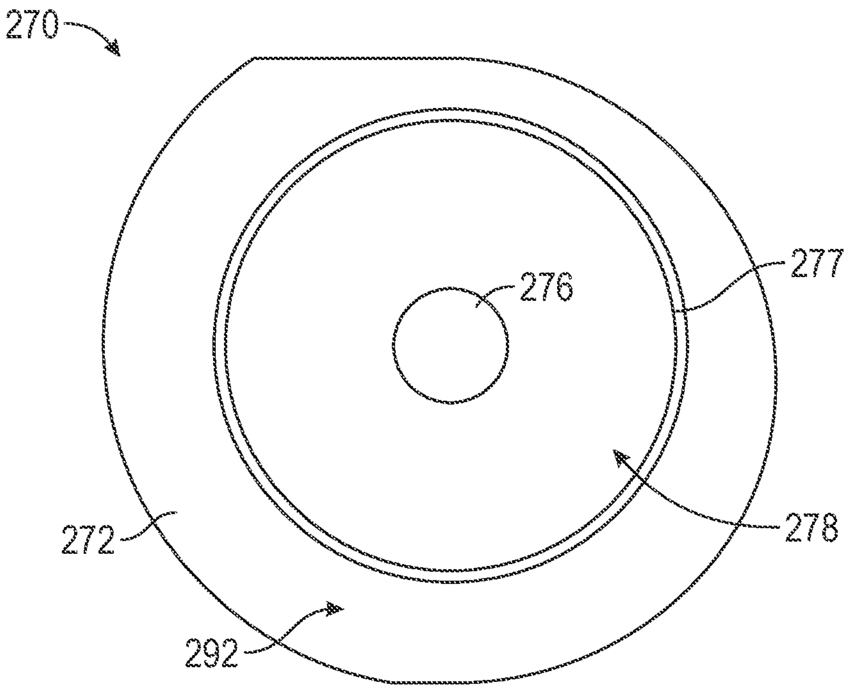

As shown in FIGS. 6F, 7B, and 7E, the bottom end 292 of the shell 272 defines an aperture, shown as ball inlet 277, that leads to an interior cavity, shown as ball chamber 278, of the ball 270. As shown in FIG. 6F, the ball inlet 277 receives the flow directing conduit 240 such that the agent outlet 244 of the flow directing conduit 240 is disposed within the ball chamber 278 of the ball 270.

As shown in FIGS. 6F and 7B-7D, the shell 272 of the ball 270 defines a cutout or notch, shown as variable flow outlet 280, extending at least partially around the periphery of the shell 272 (e.g., 60 degrees, 90 degrees, 180 degrees, 225 degrees, 270 degrees, 315 degrees, 330 degrees, anywhere therebetween, etc.). The variable flow outlet 280 has a first end, shown as minimum end 282; a second end, shown as maximum end 284; and a linearly angled profile, shown as "V" profile 286, extending between the minimum end 282 and the maximum end 284. In other embodiments, the variable flow outlet 280 has a non-linear profile (e.g., parabolic, stepped, etc.). According to an exemplary embodiment, the ball 270 is rotatable within the interior chamber 228 of the valve body 210 such that the position of the agent outlet 244 of the flow directing conduit 240 along the "V" profile 286 of the variable flow outlet 280 may be selectively varied (e.g., between the minimum end 282 and the maximum end 284, etc.). By way of example, the ball 270 may be rotated into a first position such that the variable flow outlet 280 is in a position that effectively seals the agent outlet 244 of the flow directing conduit 240. By way of another example, the ball 270 may be rotated into a second position such that the minimum end 282 of the variable flow outlet 280 aligns with the agent outlet 244 of the flow directing conduit 240, effectively setting the amount of agent that flows through the valve body 210 and out of the valve spout 260 at the minimum agent flow rate. By way of yet another example, the ball 270 may be rotated into a third position such that the maximum end 284 of the variable flow outlet 280 aligns with the agent outlet 244 of the flow directing conduit 240, effectively setting the amount of agent that flows through the valve body 210 and out of the valve spout 260 at the maximum agent flow rate. The ball 270 may further be rotated into a position between the second position and the third position to set the amount of agent that flows through the valve body 210 and out of the valve spout 260 somewhere between the minimum agent flow rate and the maximum agent flow rate (e.g., to provide the required amount of agent to the ratio controller 140 such that the agent-water solution has the appropriate agent-to-water ratio, etc.).

As a brief overview of the combined agent metering and shut-off valve assembly 400, the agent metering and shut-off valve assembly 400 includes a plunger that includes a portion that defines a non-uniform "V-shaped" profile that variably restricts agent flow through the combined agent metering and shut-off valve assembly 400. The combined agent metering and shut-off valve assembly 400 has an inlet, an outlet, and a 90 degree flow path extending therebetween. The plunger is capable of isolating or blocking the non-uniform "V-shaped" profile completely (e.g., thereby functioning as both the agent metering valve 126 and the agent shut-off valve 130, etc.). By providing a non-uniform "V-shaped" profile, agent flow can be accurately controlled over a greater range of agent and water flow rates. In some embodiments, the combined agent metering and shut-off valve assembly 400 also includes an integrated check valve (e.g., thereby functioning as all three of the agent metering valve 126, the agent shut-off valve 130, and the agent check valve 132, etc.).

Figure 8A:
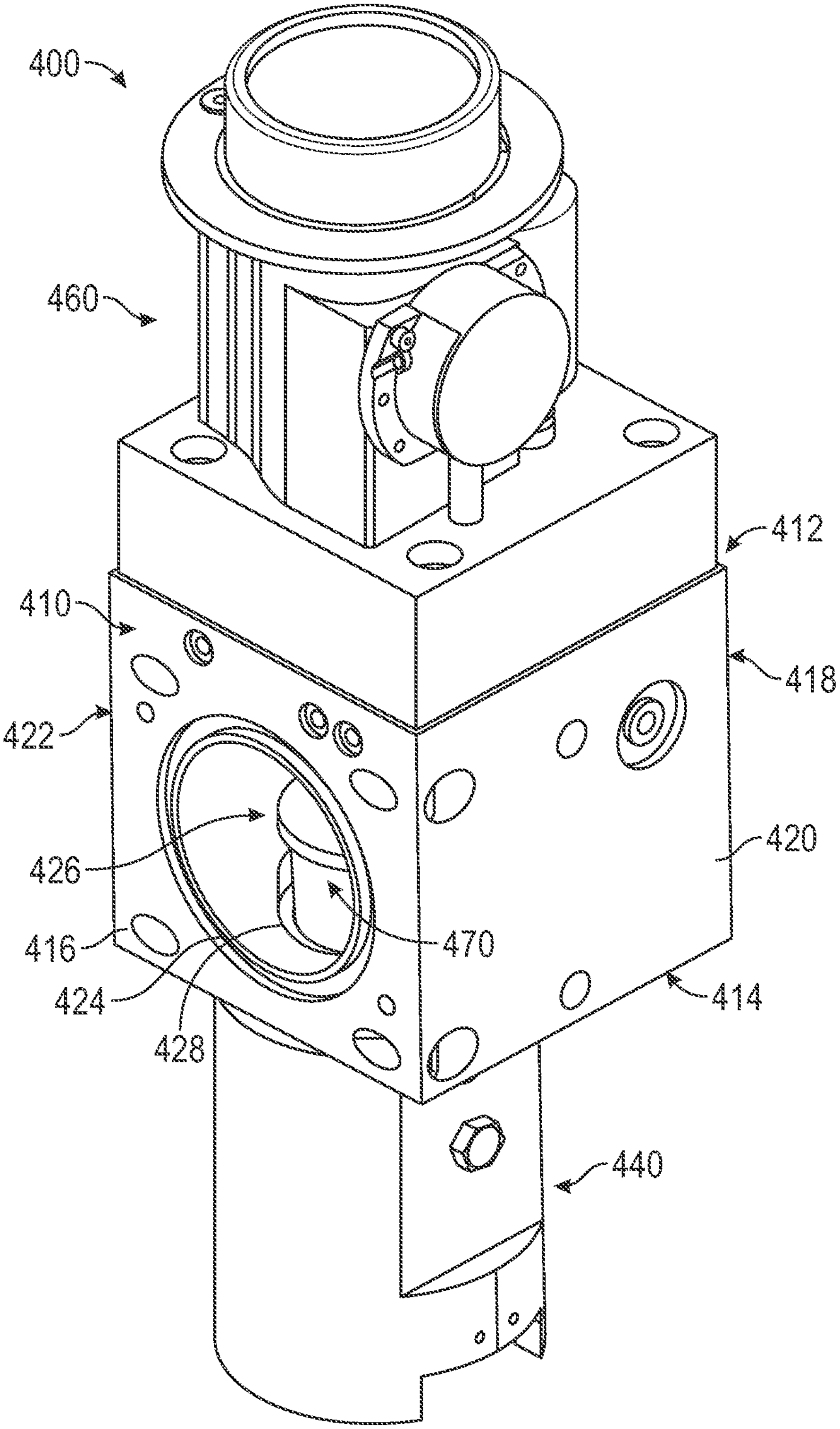
FIGS. 8A-8C are various views of a combined metering and shut-off valve assembly of the fluid delivery system of FIG. 4, according to another exemplary embodiment.
Figure 8B:
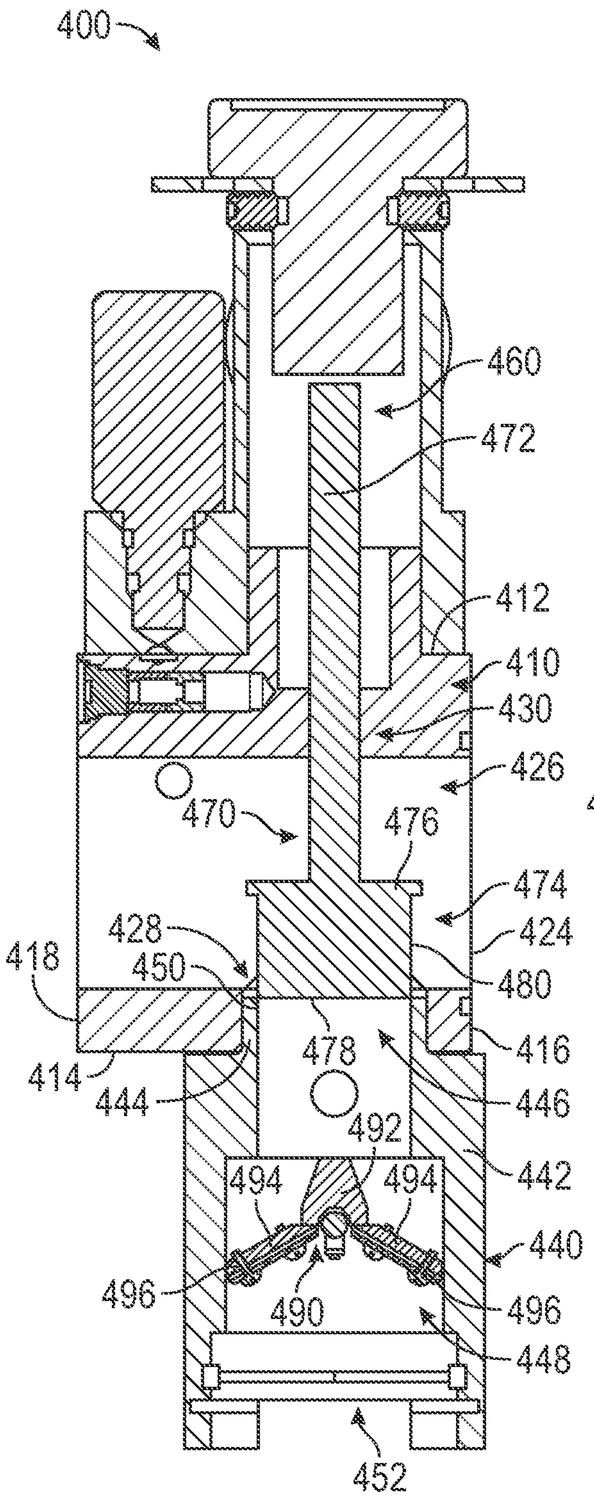
Figure 8C:
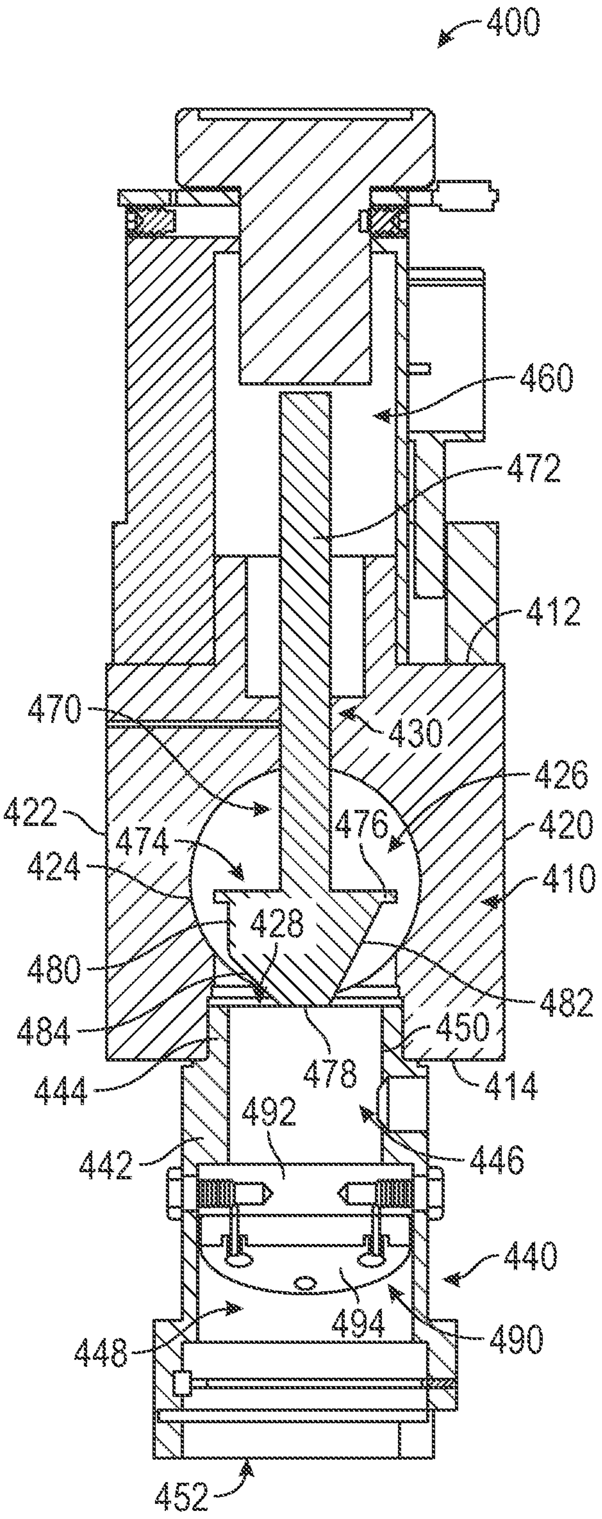
Figure 9:
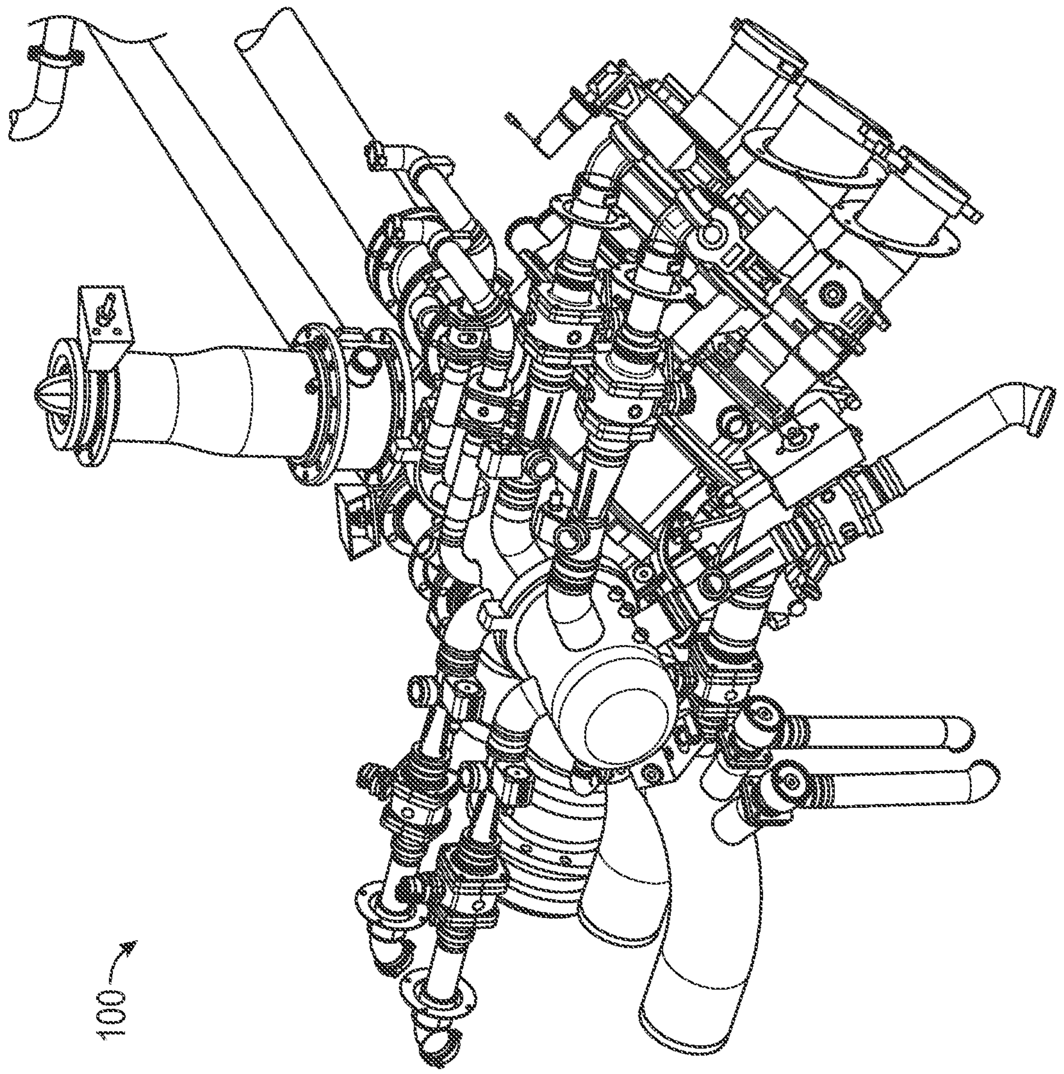
FIG. 9 is a perspective view of a portion of the fluid delivery systems of FIGS. 3 and 4, according to an exemplary embodiment.

As shown in FIGS. 8A-8C, the combined agent metering and shut-off valve assembly 400 includes a housing, shown as valve body 410; an extension, shown as valve spout 440; a driver (e.g., a solenoid, an electric actuator, a manual actuator, etc.), shown as actuator 460; a flow restrictor or plunger, shown as needle 470; and a one-way valve, shown as integrated check valve 490. In some embodiments, the integrated check valve 490 eliminates the need for the agent check valve 132 along the agent circuit 120. In some embodiments, the combined agent metering and shut-off valve assembly 400 does not include the integrated check valve 490.

As shown in FIGS. 8A-8C, the valve body 410 is a rectangular prism having a first end, shown as top end 412; an opposing second end, shown as bottom end 414; a first face, shown as left face 416; a second face, shown as right face 418; a third face, shown as front face 420; and a fourth face, shown as rear face 422. In other embodiments, the valve body 410 has another shape (e.g., a cylinder, a cube, etc.). As shown in FIGS. 8A-8C, the left face 416 defines a first aperture, shown as valve body inlet 424, the bottom end 414 defines a second aperture, shown as valve body outlet 428, and the top end 412 defines a third aperture, shown as rod aperture 430. The valve body 410 defines a first chamber, shown as inlet chamber 426, that connects the valve body inlet 424 to the valve body outlet 428.

As shown in FIGS. 8B and 8C, the valve spout 440 has a first portion, shown as body 442, and a second portion, shown as flange 444, extending from a first end of the body 442 and having a diameter less than a diameter of the body 442. An opposing second end of the body 442 defines an outlet, shown as valve spout outlet 452, and the flange 444 defines an inlet, shown as valve spout inlet 450. The valve spout 440 defines a second, intermediate chamber, shown as intermediate chamber 446, and a third chamber, shown as outlet chamber 448. The intermediate chamber 446 and the outlet chamber 448 connect the valve spout inlet 450 and the valve spout outlet 452.

As shown in FIGS. 8A-8C, the valve spout 440 extends from the bottom end 414 of the valve body 410. As shown in FIGS. 8B and 8C, the flange 444 interfaces with and is received by the valve body outlet 428 such that the valve spout inlet 450 aligns with the valve body outlet 428, connecting the inlet chamber 426 to the intermediate chamber 446. In some embodiments, the valve body 410 and the valve spout 440 are integrally formed (e.g., a single, unitary structure, etc.). As shown in FIGS. 8B and 8C, the inlet chamber 426, the intermediate chamber 446, and the outlet chamber 448 cooperatively form a flow path from the valve body inlet 424 to the valve spout outlet 452. According to an exemplary embodiment shown in FIGS. 8B and 8C, the valve spout outlet 452 is positioned perpendicularly relative to the valve body inlet 424 such that incoming agent to the valve body 410 flows along a ninety degree flow path (e.g., the agent comes into the inlet chamber 426 through the valve body inlet 424 in the left face 416 of the valve body 410, exits the bottom end 414 of the valve body 410 through the valve body outlet 428 and the valve spout inlet 450 into the intermediate chamber 446, then through the outlet chamber 448 to the valve spout outlet 452, etc.).

As shown in FIGS. 8B and 8C, the needle 470 includes a shaft, shown as rod 472, having a first end coupled to the actuator 460 and an opposing second end that extends through the rod aperture 430 into the inlet chamber 426 of the valve body 410 and has a head (e.g., a plunger head, etc.), shown as variable flow head 474, coupled thereto. According to an exemplary embodiment, the actuator 460 is positioned and configured to variably reposition the needle 470 between a first, fully-extended position and a second, fully-retracted position (e.g., based on inputs received from the valve controller 128, etc.). In some embodiments, the actuator 460 is electronically controlled by the valve controller 128. In some embodiments, the actuator 460 is additionally or alternatively manually operable. By way of example, selectively repositioning the variable flow head 474 into the first, fully-extended position may position the variable flow head 474 such that the inlet chamber 426 is effectively sealed from the intermediate chamber 446 and the outlet chamber 448 to prevent any agent flow therebetween. By way of another example, selectively repositioning the variable flow head 474 into the second, fully-retracted position may position the variable flow head 474 such that agent flow from the inlet chamber 426 to the intermediate chamber 446 and the outlet chamber 448 is substantially uninhibited.

As shown in FIGS. 8B and 8C, the variable flow head 474 include a top portion, shown as annular ring 476, coupled to the opposing second end of the rod 472; a bottom portion, shown as bottom 478; and a sidewall (e.g., a cylindrical sidewall, etc.), shown as peripheral wall 480, extending between the annular ring 476 and the bottom 478 of the variable flow head 474 and having a diameter less than that of the annular ring 476. According to an exemplary embodiment, the annular ring 476 has a diameter that is larger than the diameter of the valve spout inlet 450 but that is less than or substantially equal to the diameter of the valve body outlet 428. The annular ring 476 may therefore be received by the valve body outlet 428 and engage with the end of the flange 444 of the valve spout 440 when the needle 470 is selectively repositioned into the first, fully-extended position and, thereby, selectively seal the inlet chamber 426 from the intermediate chamber 446 and the outlet chamber 448, restricting agent flow therebetween.

As shown in FIG. 8C, a portion of the peripheral wall 480 (e.g., a notched portion, a portion that is cutout from the peripheral wall 480 of the variable flow head 474, etc.) defines an non-uniform "V-shaped" profile having a first portion, shown first angled wall 482, and an opposing second portion, shown as second angled wall 484. The first angled wall 482 extends linearly at a first angle from the annular ring 476 along a first side of the peripheral wall 480 to the bottom 478 toward the center of the variable flow head 474, while the second angled wall 484 extends linearly at a second, different angle from a position along an opposing second side of the peripheral wall 480 between the annular ring 476 and the bottom 478 (e.g., approximately half way down the peripheral wall 480, etc.) to the bottom 478 toward the center of the variable flow head 474. According to an exemplary embodiment, the first angle is less than the second angle (e.g., the first angled wall 482 is less steep or has a lesser slope than the second angled wall 484, etc.). In other embodiments, the first angled wall 482 and/or the second angled wall 484 extend at different angles and/or from other positions along the peripheral wall 480. In some embodiments, the first angled wall 482 and/or the second angled wall 484 have a non-linear profile (e.g., curved, parabolic, etc.).

According to an exemplary embodiment, the variable flow head 474 is configured to facilitate providing fine and precise control of agent flow through the combined agent metering and shut-off valve assembly 400 in a first sub-set of positions for lower agent percentages of the agent-water solution (e.g., between the first, fully extended position and an intermediate position, etc.) and provide greater agent flow through the combined agent metering and shut-off valve assembly 400 in a second sub-set of positions for high agent percentages of the agent-water solution (e.g., between the intermediate position and the second, fully-retracted position, etc.). By way of example, while the variable flow head 474 is at least partially extended through the valve body outlet 428 and the valve spout inlet 450 (e.g., between the first, fully extended position and the intermediate position, etc.) such that the peripheral wall 480 adjacent the second angled wall 484 is in contact with the interior wall of the intermediate chamber 446, isolating the second angled wall 484 from the inlet chamber 426, agent may only flow through one side of the non-uniform “V-shaped” profile (i.e., through a first gap formed between the first angled wall 482 and the interior wall of the intermediate chamber 446). As the variable flow head 474 is retracted from the intermediate chamber 446, the first gap formed between the first angled wall 482 and the interior wall of the intermediate chamber 446 continues to increase in size, and as a result the agent flow therethrough increases. However, once the intermediate position is reached, the peripheral wall 480 adjacent the second angled wall 484 completely disengages from the interior wall of the intermediate chamber 446, thereby exposing a second gap between the interior wall of the intermediate chamber 446 and the second angled wall 484. As the variable flow head 474 continues to be retracted up to the second, fully-retracted position, the first gap and the second gap continue to increase is size, thereby increasing the agent flow from the inlet chamber 426 into the intermediate chamber 446 and the outlet chamber 448.

As shown in FIGS. 8B and 8C, the integrated check valve 490 is positioned within the outlet chamber 448. According to an exemplary embodiment, the integrated check valve 490 is configured to prevent agent, water, and/or an agent-water solution from flowing through the valve spout outlet 452 up the valve spout 440 into the intermediate chamber 446 and/or the inlet chamber 426. As shown in FIGS. 8B and 8C, the integrated check valve 490 includes (i) a base, shown base 492, that extends along the center of the valve spout 440 and entirely across the outlet chamber 448, and (ii) a pair of pivotal blockers, shown as flaps 494, extending in opposing directions from the base 492 at a downward angle to the interior wall of the outlet chamber 448. The flaps 494 are pivotally coupled to the interior wall of the outlet chamber 448 with couplers, shown as pivotal couplers 496. According to an exemplary embodiment, agent flow from the intermediate chamber 446 to the outlet chamber 448 forces the flaps 494 downward such that the flaps 494 pivot away from the base 492, opening the integrated check valve 490. Conversely, agent, water, and/or an agent-water solution flowing in the opposing direction forces the flaps 494 upward such that the flaps 494 pivot toward the base 492, closing the integrated check valve 490.

According to an exemplary embodiment, the agent check valve 132 is configured to prevent agent, water, and/or an agent-water solution from flowing back into the agent circuit 120. Therefore, only agent may flow through the agent check valve 132 towards the ratio controller 140, but nothing may flow through the agent check valve 132 in the reverse direction. In some embodiments, the agent circuit 120 does not include the agent check valve 132 (e.g., in embodiments that include the combined agent metering and shut-off valve assembly 400, etc.).

As shown in FIGS. 3 and 4, the ratio controller 140 is positioned to receive water from the water circuit 110 and/or agent from the agent circuit 120. According to an exemplary embodiment, the ratio controller 140 is configured to facilitate mixing the water and the agent received thereby to provide an agent-water solution having a desired agent-to-water ratio.

Figure 5A:
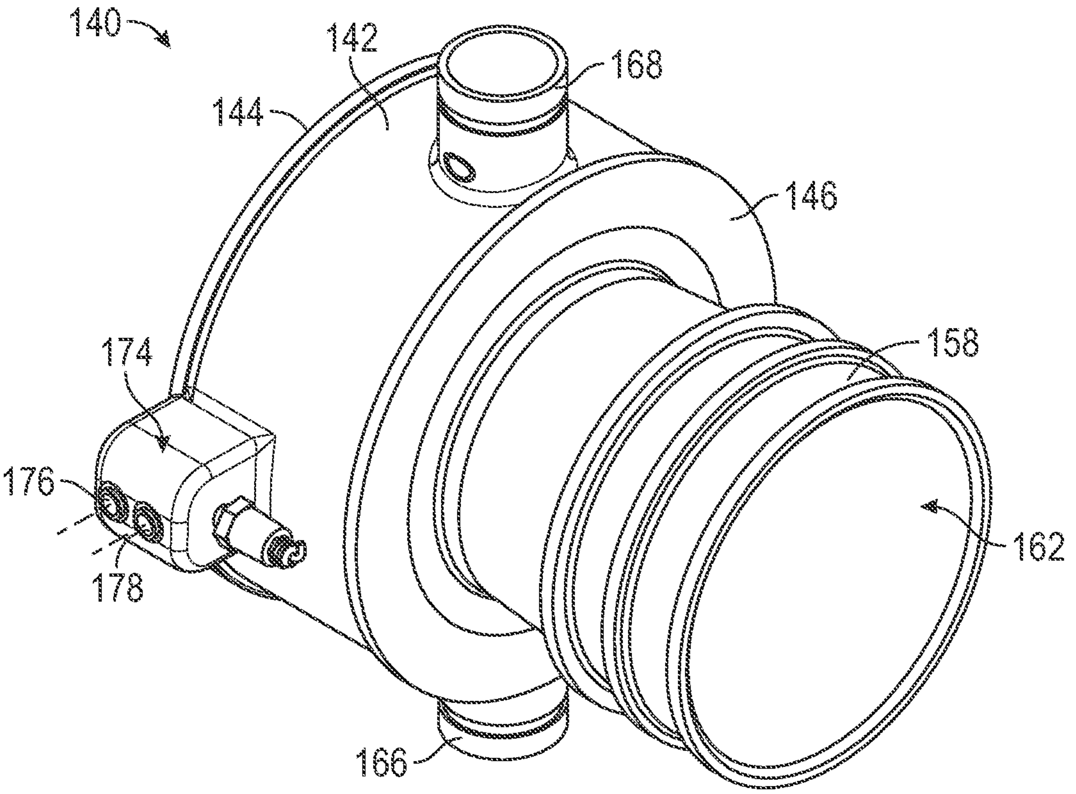
FIGS. 5A-5D are various views of a ratio controller of the fluid delivery systems of FIGS. 3 and 4, according to an exemplary embodiment.
Figure 5B:
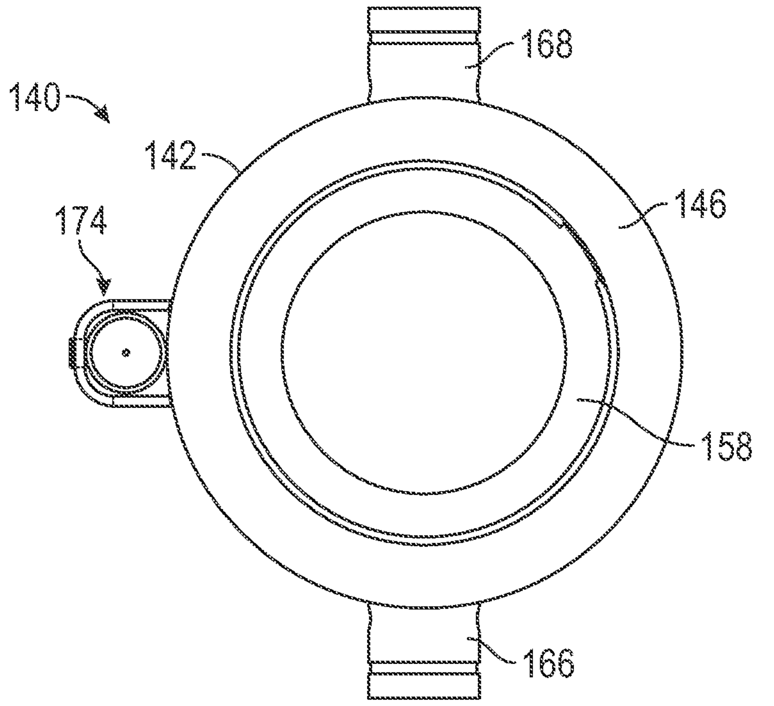
Figure 5C:
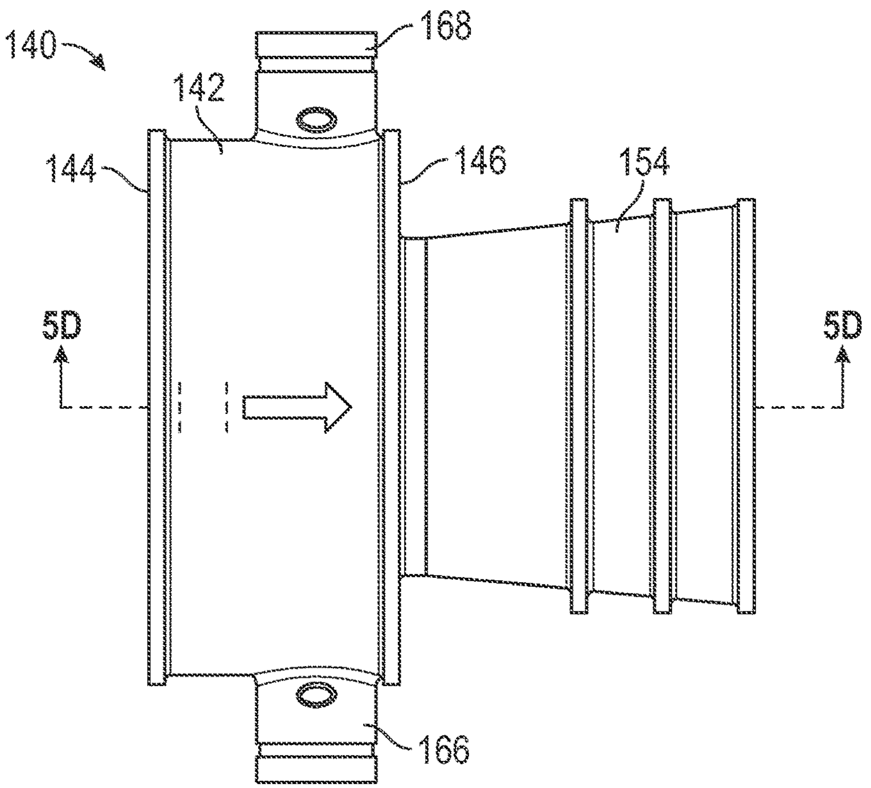
Figure 5D:
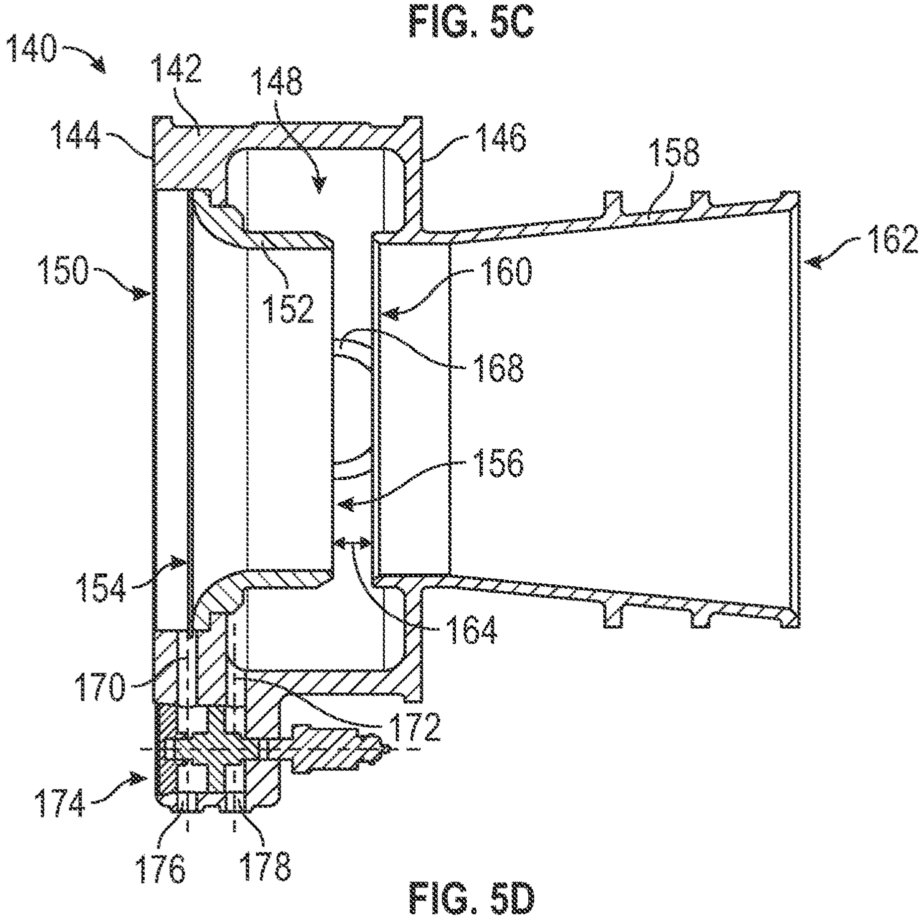

As shown in FIGS. 5A-5D, the ratio controller 140 includes a main body, shown as housing 142. The housing 142 has a first side, shown as inlet side 144, and an opposing second side, shown as outlet side 146, spaced apart by a peripheral sidewall. As shown in FIGS. 5A, 5C, and 5D, a protrusion, shown as diffuser 158, extends from the outlet side 146 of the housing 142. According to the exemplary embodiment shown in FIG. 5D, the housing 142 and the diffuser 158 are integrally formed. As shown in FIG. 5D, the housing 142 defines an internal cavity, shown a mixing chamber 148. The inlet side 144 of the housing 142 defines an aperture, show as water inlet 150. According to an exemplary embodiment, the water inlet 150 is configured to couple to the water circuit 110 and receive water therefrom. As shown in FIG. 5D, the ratio controller 140 includes a choke, shown as water nozzle 152, coupled to an interior of the housing 142, proximate the water inlet 150 and extending at least partially into the mixing chamber 148 (e.g., the water nozzle 152 is disposed entirely within the housing 142, etc.). The water nozzle 152 has an inlet, shown as water inlet 154, positioned to receive water from the water inlet 150 of the housing 142 and an outlet, shown as water outlet 156.

As shown in FIGS. 5A-5D, the ratio controller 140 includes agent inlets, shown as lower agent port 166 and upper agent port 168. According to an exemplary embodiment, the lower agent port 166 and the upper agent port 168 are configured to couple to the agent circuit 120 and receive agent therefrom such that agent is injected into the mixing chamber 148 of the housing 142. As shown in FIG. 5D, the diffuser 158 has an inlet, shown as solution inlet 160, and an outlet, shown as solution outlet 162. The solution inlet 160 extends at least partially into the mixing chamber 148 of the housing 142. The water outlet 156 of the water nozzle 152 and the solution inlet 160 of the diffuser 158 are thereby spaced a distance apart that forms a gap, shows a gap 164, therebetween that has a width that is less than the width of the mixing chamber 148. According to an exemplary embodiment, the agent flowing into the mixing chamber 148 through the lower agent port 166 and/or the upper agent port 168 mixes with the water exiting the water outlet 156 of the water nozzle 152, and then discharges as an agent-water solution through the solution outlet 162 of the diffuser 158.

As shown in FIG. 5D, the peripheral sidewall of the housing 142 defines a first port, shown as high pressure port 170, positioned proximate the water inlet 154 of the water nozzle 152 and a second port, shown as low pressure port 172, positioned within the mixing chamber 148 (e.g., proximate the inlet side 144 of the housing 142, etc.). As shown in FIGS. 5A, 5B, and the ratio controller 140 includes a manifold, shown as pressure manifold 174, coupled to the housing 142. As shown in FIGS. 5A and 5D, the pressure manifold 174 defines a first chamber, shown as high pressure chamber 176, positioned to align with the high pressure port 170 and a second chamber, shown as low pressure chamber 178, positioned to align with the low pressure port 172. According to an exemplary embodiment, the high pressure port 170 and the high pressure chamber 176 facilitate monitoring the pressure of the water entering the ratio controller 140 (e.g., a high pressure, etc.) and the low pressure port 172 and the low pressure chamber 178 facilitate monitor the pressure of the solution within the mixing chamber 148 (e.g., a low pressure, etc.).

As shown in FIGS. 3 and 4, the ratio controller 140 optionally includes a flow meter, shown as water flow meter 180. The ratio controller 140 may therefore have an integrated water flow meter. According to an exemplary embodiment, the water nozzle 152 and the diffuser 158 function as a venturi (e.g., the water nozzle tapers inwards and the diffuser tapers outwards which causes the Venturi effect, a pressure drop as the velocity increases through the nozzle, etc.). According to an exemplary embodiment, the water flow meter 180 is coupled to the pressure manifold 174 such that the water flow meter 180 is configured to monitor the high pressure of the high pressure port 170 and the low pressure of the low pressure port 172. The water flow meter 180 may be further configured to receive an indication of and/or determine the agent flow rate entering the mixing chamber 148. In some embodiments, the indication of the agent flow rate may be provided by a signal from the agent circuit sensor 104 (e.g., an agent flow meter, etc.). In some embodiments, the water flow meter 180 is configured to determine the agent flow rate based on (i) the pressure of the agent exiting the agent pump 124 (e.g., received from the agent circuit sensor 104, received directly from the agent pump 124, etc.) and (ii) the current setting of the agent metering valve 126, the combined agent metering and shut-off valve assembly 200, or the combined agent metering and shut-off valve assembly 400 (e.g., the orifice size, valve position, etc.). According to an exemplary embodiment, the water flow meter 180 is configured to determine the flow rate of the water entering the ratio controller 140 based on the high pressure, the low pressure, and/or the agent flow rate (e.g., which may be used by the valve controller 128, etc.).

According to an exemplary embodiment, the discharge valve 182 is configured to facilitate selectively restricting the flow of the agent-water solution. By way of example, the discharge valve 182 may (i) prevent the agent-water solution from passing therethrough when arranged in a first configuration (e.g., a closed configuration, etc.) and (ii) allow the agent-water solution to pass freely therethrough when arranged in a second configuration (e.g., an open configuration, etc.) such that the agent-water solution may be discharged from the fluid delivery system 100. According to an exemplary embodiment, the agent-water solution exiting the discharge valve 182 is directed to one or more outlets of the fire fighting vehicle 10 such as a turret 190, a structural discharge, and/or a hose reel. As shown in FIG. 1, the turret 190 is positioned on the front end of the front cabin 20. As shown in FIG. 2, the turret 190 is positioned on the distal end of the aerial ladder assembly 50.

Figure 10:
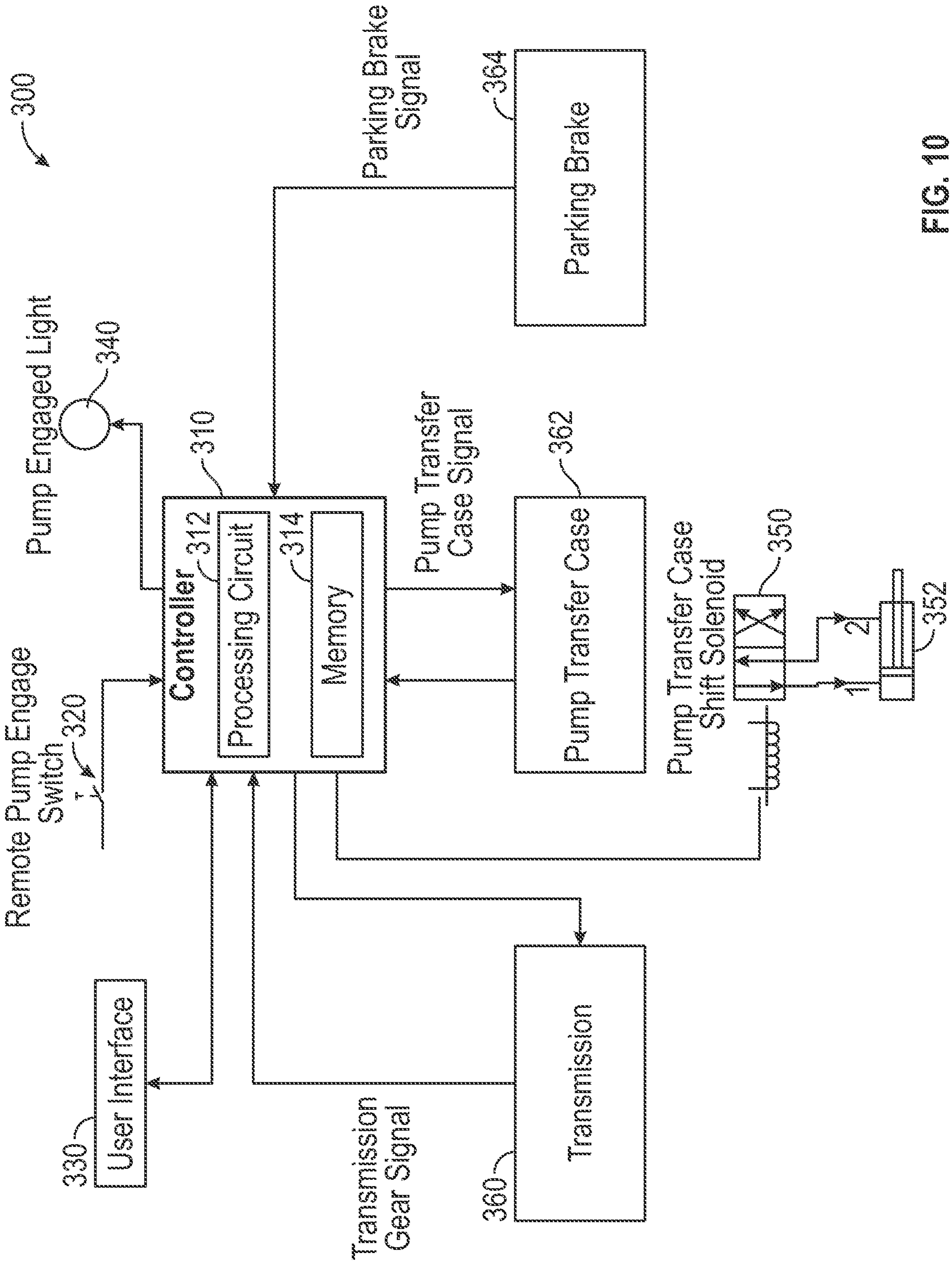
FIG. 10 is a schematic diagram of a pump engagement system for a pump of the fire fighting vehicles of FIGS. 1 and 2, according to an exemplary embodiment.

As shown in FIGS. 1 and 2, the fire fighting vehicle 10 includes a control system, shown as pump engagement system 300. As shown in FIG. 10, the pump engagement system includes a controller 310. In one embodiment, the controller 310 is configured to selectively engage, selectively disengage, control, or otherwise communicate with components of the fire fighting vehicle 10. As shown in FIG. 10, the controller 310 is coupled to a remote pump engage switch 320, a user interface 330, a pump engaged light 340, a pump transfer case shift solenoid 350, a transmission 360 (e.g., of the powertrain 40, etc.), a pump transfer case 362 (e.g., of the powertrain 40, etc.), and a parking brake 364. The controller 310 may be configured to facilitate an operator in shifting the water pump 114 into a pump mode while in the front cabin 20 (e.g., using the user interface 330, etc.) and/or remotely from any position on the fire fighting vehicle other than the front cabin 20 (e.g., using the remote pump engage switch 320, etc.). By way of example, the controller 310 may send and receive signals with the remote pump engage switch 320, the user interface 330, the pump engaged light 340, the pump transfer case shift solenoid 350, the transmission 360, the pump transfer case 362, and/or the parking brake 364.

The controller 310 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 10, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices (e.g., servers, data centers, etc.). In such cases, the processing circuit 312 represents the collective processors of the devices, and the memory 314 represents the collective storage devices of the devices.

According to an exemplary embodiment, the remote pump engage switch 320 is positioned remotely from the front cabin 20 of the fire fighting vehicle 10. The remote pump engage switch 320 may be positioned on or at any location of the fire fighting vehicle 10 other the front cabin 20. Typically, if there is no need for fire extinguishing capabilities at a scene, a fire fighter will not activate a pump system of a fire fighting vehicle. In traditional systems, if a need for fire suppression arises after arrival, a mid-ship pump can only be shifted into a pump mode from inside the cab of the vehicle, which causes unnecessary delays. The remote pump engage switch 320 is positioned externally from the front cabin 20 such that the mid-ship pump (e.g., the water pump 114, etc.) may be engaged without having to enter the front cabin 20, saving valuable time and effort.

In one embodiment, the user interface 330 includes a display and an operator input. The display and/or the operator input may be positioned within the front cabin 20 and/or at any positioned along the exterior of the fire fighting vehicle 10. The display may be configured to display a graphical user interface, an image, an icon, or still other information. In one embodiment, the display includes a graphical user interface configured to provide general information about the vehicle (e.g., vehicle speed, fuel level, warning lights, agent levels, water levels, etc.). The graphical user interface may also be configured to display a current water flow rate, a current agent flow rate, a current agent-to-water ratio, etc. By way of example, the graphical user interface may be configured to provide specific information regarding the operation of the fire fighting vehicle 10, the fluid delivery system 100, and/or the pump engagement system 300.

The operator input may be used by an operator to provide commands to at least one of the fire fighting vehicle 10, the fluid delivery system 100 (e.g., the water pump 114, the agent pump 124, the valve controller 128, the agent shut-off valve 130, the water flow meter 180, the discharge valve, etc.), and the pump engagement system 300 (e.g., the pump engaged light 340, the transmission 360, the pump transfer case 362, the parking brake 364, the pump transfer case shift solenoid 350, etc.). The operator input may include one or more buttons, knobs, touchscreens, switches, levers, joysticks, pedals, or handles. The operator may be able to manually control some or all aspects of the operation of the pump engagement system 300, the fluid delivery system 100, and/or the fire fighting vehicle 10 using the display and the operator input. It should be understood that any type of display or input controls may be implemented with the systems and methods described herein.

According to an exemplary embodiment, the controller 310 is configured to receive a pump shift input. In some embodiments, the pump shift input is provided by a user with the remote pump engage switch 320 (e.g., externally from the front cabin 20, etc.). In some embodiments, the pump shift input is provided by a user with the user interface 330 (e.g., externally from the front cabin 20, internally within the front cabin 20, etc.). The controller 310 is further configured to receive (i) a transmission gear signal from the transmission 360 such that the controller 310 may determine whether the transmission 360 is in neutral and (ii) a parking brake signal from the parking brake 364 such that the controller 310 may determine whether the parking brake 364 is engaged in response to receiving the pump shift input. In some embodiments, the controller 310 is configured to shift the transmission 360 into neutral in response to the transmission 360 being in gear (e.g., reverse, drive, etc.). In some embodiments, the controller 310 is configured to provide an indication on the user interface 330 that the transmission 360 needs to be shifted into neutral by the operator in response to the transmission 360 being in gear. In some embodiments, the controller 310 is configured to engage the parking brake 364 in response to the parking brake 364 not being engaged. In some embodiments, the controller 310 is configured provide an indication on the user interface 330 that the parking brake 364 needs to be engaged by an operator in response to the parking brake 364 not being engaged.

According to an exemplary embodiment, the controller 310 is configured to send a shift signal to the pump transfer case shift solenoid 350 such that the pump transfer case 362 may be shifted into the pump mode in response to the transmission 360 being in neutral and the parking brake being engaged. According to an exemplary embodiment, the pump transfer case 362 is configured to selectively, mechanically couple the engine of the powertrain 40 to the water pump 114 such that the water pump 114 may be selectively driven by the engine (e.g., during the pump mode, etc.). By way of example, the pump transfer case shift solenoid 350 engages a shift element, shown as shift cylinder 352, in response to receiving the shift signal from the controller 310. The engagement of the shift cylinder 352 with the pump transfer case shift solenoid 350 causes the shift cylinder 352 to shift the pump transfer case 362 from a first mode (e.g., a non-pumping mode, etc.) where the engine is effectively decoupled from the water pump 114 to a second mode (e.g., the pump mode, etc.) where the engine is effectively coupled to the water pump 114. When in the second, pump mode, the engine may thereby drive the water pump 114 through the pump transfer case 362.

The controller 310 may be further configured to determine whether the pump transfer case 362 was effectively shifted into the second, pump mode after the engagement of the shift cylinder 352. The controller 310 may be configured to provide an indication on the user interface 330 that the shift failed in response to the pump transfer case 362 not being in the pump mode. The controller 310 may be configured to shift the transmission 360 into drive such that the engine begins to drive the water pump 114 in response to the pump transfer case 362 shifting into the pump mode. In some embodiments, the controller 310 is configured to provide an indication that the water pump 114 has been engaged and is in operation at least one of on the user interface 330 and with the pump engaged light 340 (e.g., illuminating the pump engaged light 340, etc.). Thereafter, the operator may discharge water, agent, and/or an agent-water solution using the fluid delivery system 100 to suppress and extinguish a fire.

Figure 11:
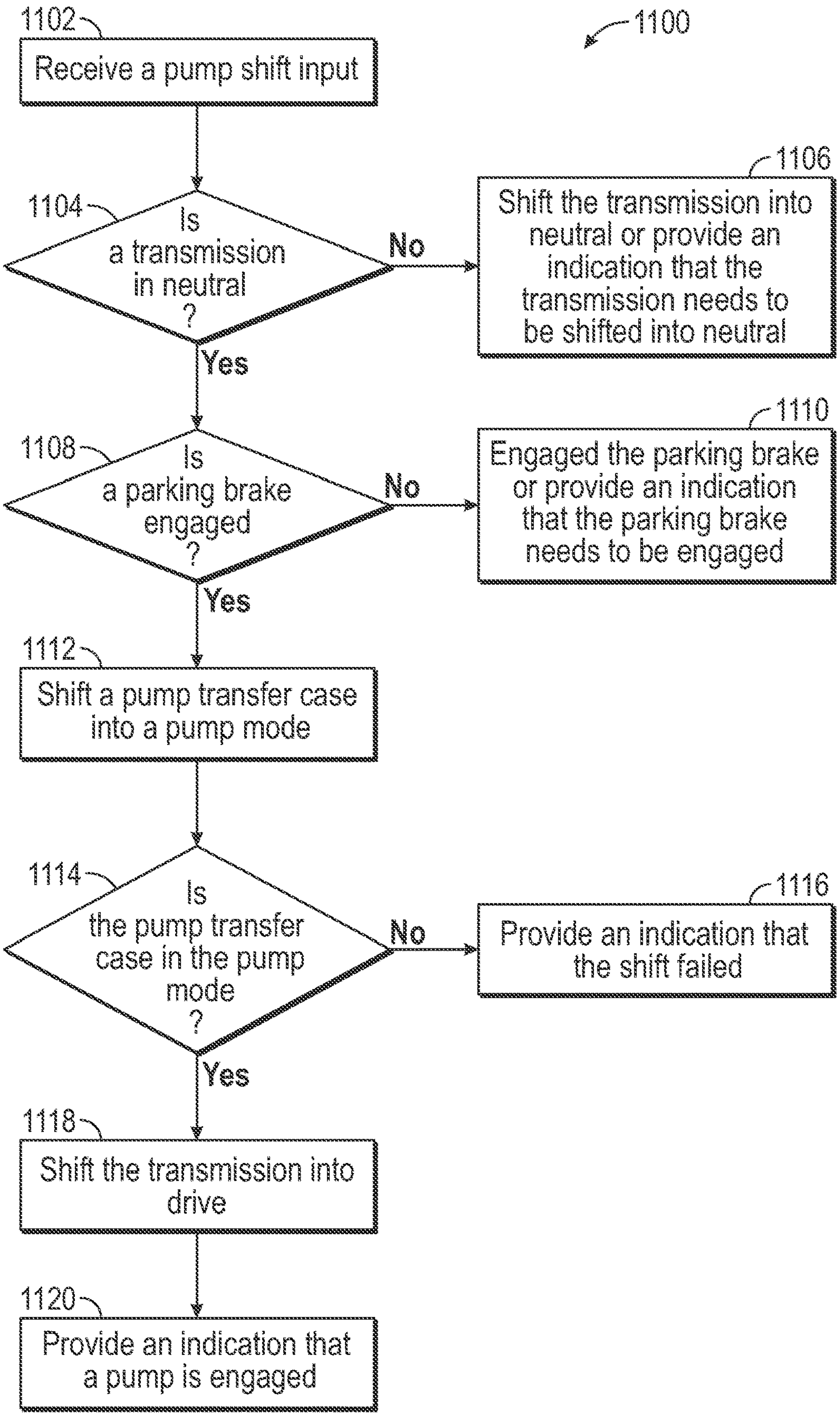
FIG. 11 is a flow diagram of a method for a shifting a pump into a pump mode, according to an exemplary embodiment.

Referring now to FIG. 11, a method 1100 for a shifting a pump into a pump mode is shown according to an exemplary embodiment. At step 1102, a controller (e.g., the controller 310, etc.) is configured to receive a pump shift input. In some embodiments, the pump shift input is provided by a user with a pump switch (e.g., the remote pump engage switch 320, etc.). In some embodiments, the pump shift input is provided by a user with a user interface (e.g., the user interface 330, etc.). At step 1104, the controller is configured to determine whether a transmission (e.g., the transmission 360, etc.) of a vehicle (e.g., the fire fighting vehicle 10, etc.) is in neutral. At step 1106, the controller is configured to shift the transmission into neutral or provide an indication (e.g., on the user interface 330, etc.) that the transmission needs to be shifted into neutral to proceed in response to the transmission being in gear (e.g., not in neutral, etc.). At step 1108, the controller is configured to determine whether a parking brake (e.g., the parking brake 364, etc.) is engaged in response to the transmission being in neutral. At step 1110, the controller is configured to engage the parking brake or provide an indication (e.g., on the user interface 330, etc.) that the parking brake needs to be engaged to proceed in response to the parking brake not being engaged. At step 1112, the controller is configured to shift a pump transfer case (e.g., the pump transfer case shift solenoid 350 coupled to the pump transfer case 362, etc.) coupled to a pump (e.g., the water pump 114, etc.) and an engine of the vehicle into a pump mode such that the pump may be driven by the engine in response to the transmission being in neutral and the parking brake being engaged.

At step 1114, the controller is configured to determine whether the pump transfer case shifted into the pump mode. At step 1116, the controller is configure to provide an indication (e.g., on the user interface 330, etc.) that the shift failed in response to the pump transfer case not being in the pump mode. At step 1118, the controller is configured to shift the transmission into drive such that the engine begins to drive the pump in response to the transfer case shifting into the pump mode. At step 1120, the controller is configured to provide an indication that the pump is engaged (e.g., on the user interface 330, with the pump engaged light 340, etc.).

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the lateral access limitation system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A ratio controller for a fluid system of a fire apparatus, the ratio controller comprising:
- a housing having a unitary structure, the housing defining:
  - a water inlet configured to receive water from a water supply;
  - an outlet configured to output an agent-water solution;
  - a mixing chamber positioned between the water inlet and the outlet;
  - a first pressure port extending through a sidewall of the housing at a first position proximate the water inlet; and
  - a second pressure port extending through the sidewall of the housing at a second position proximate the mixing chamber; and
- an agent port positioned between the water inlet and the outlet, the agent port protruding radially outward from an exterior surface of the sidewall external to the ratio controller, the agent port defining an agent inlet extending through the housing to the mixing chamber, the agent port configured to receive agent from an agent supply and provide the agent to the mixing chamber.

2. The ratio controller of claim 1, further comprising a nozzle extending at least partially into the mixing chamber, the nozzle including a nozzle inlet positioned proximate the first pressure port and a nozzle outlet positioned within the mixing chamber.

3. The ratio controller of claim 2, wherein the first pressure port is positioned between the water inlet and the nozzle inlet.

4. The ratio controller of claim 1, further comprising a diffuser extending from the outlet outward from the housing, the diffuser including a diffuser inlet positioned within the mixing chamber and a diffuser outlet.

5. The ratio controller of claim 1, further comprising a nozzle and a diffuser, wherein at least one of the nozzle or the diffuser at least partially extends into the mixing chamber such that a nozzle outlet of the nozzle and a diffuser inlet of the diffuser are spaced a distance that is less than a width of the mixing chamber.

6. The ratio controller of claim 1, wherein the agent port is a first agent port and the agent inlet is a first agent inlet, further comprising a second agent port positioned between the water inlet and the outlet, the second agent port protruding radially outward from the exterior surface of the housing external to the ratio controller, wherein the second agent port defines a second agent inlet extending through the housing to the mixing chamber and configured to receive the agent from the agent supply.

7. The ratio controller of claim 6, wherein the first agent port and the second agent port are positioned along the sidewall of the housing.

8. The ratio controller of claim 7, wherein the first agent port and the second agent port are positioned on opposing sides of the mixing chamber, and wherein the first agent port and the second agent port are integrally formed with the housing.

9. The ratio controller of claim 1, further comprising a pressure manifold coupled to an exterior of the housing, wherein the pressure manifold defines a first chamber positioned to align with the first pressure port and a second chamber positioned to align with the second pressure port.

10. The ratio controller of claim 1, further comprising a flow meter coupled to the first pressure port and the second pressure port to monitor (i) an inlet pressure of the water entering the ratio controller and (ii) an intermediate pressure within the mixing chamber to facilitate determining a water flow rate of the water.

* * * * *